US011012267B2

(12) United States Patent
Huang et al.

(10) Patent No.: US 11,012,267 B2
(45) Date of Patent: May 18, 2021

(54) METHOD FOR RECEIVING ASYNCHRONOUS-CLOCK MULTI-TRANSMITTER DATA, AND RECEIVER

(71) Applicant: HUAWEI TECHNOLOGIES CO., LTD., Guangdong (CN)

(72) Inventors: Yuanda Huang, Dongguan (CN); Xie Wang, Shenzhen (CN); Liangchuan Li, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/393,885

(22) Filed: Apr. 24, 2019

(65) Prior Publication Data
US 2019/0253285 A1  Aug. 15, 2019

Related U.S. Application Data

(63) Continuation of application No. PCT/CN2016/103455, filed on Oct. 26, 2016.

(51) Int. Cl.
*H04L 27/01* (2006.01)
*H04L 25/03* (2006.01)
(Continued)

(52) U.S. Cl.
CPC ..... *H04L 25/03949* (2013.01); *H04B 1/7103* (2013.01); *H04B 7/0413* (2013.01);
(Continued)

(58) Field of Classification Search
CPC ... H04B 1/10; H04B 7/06; H04B 7/08; H04B 7/10; H04B 7/088; H04B 7/0413;
(Continued)

(56) References Cited

U.S. PATENT DOCUMENTS

| 6,091,703 A | 7/2000 | Saunders et al. |
| 2002/0131482 A1 | 9/2002 | Kent |
| 2005/0271137 A1* | 12/2005 | Kolze ............... H04L 25/03006 375/233 |
| 2009/0150310 A1 | 6/2009 | Okada |

(Continued)

FOREIGN PATENT DOCUMENTS

| CN | 1630993 A | 6/2005 |
| CN | 101841327 A | 9/2010 |

(Continued)

OTHER PUBLICATIONS

Xiaodong Wang et al, Iterative (Turbo) Soft Interference Cancellation and Decoding for Coded CDMA. IEEE Transactions on Communications, vol. 47, No. 7, Jul. 1999, 16 pages.
(Continued)

*Primary Examiner* — Shawkat M Ali
(74) *Attorney, Agent, or Firm* — Womble Bond Dickinson (US) LLP

(57) ABSTRACT

A receiver in the present disclosure includes: a first input end, N first output ends, N baseband signal recovery modules, and a multiple-input multiple-output equalization module. Each baseband signal recovery module includes two second output ends; one second output end of each baseband signal recovery module is configured to output a baseband signal; and the other second output end is configured to output data enabling control information. The multiple-input multiple-output equalization module is configured to: control, based on N pieces of data enabling control information, a time sequence of N baseband signals entering the multiple-input multiple-output equalization module for equalization filtering processing, and perform equalization filtering processing on the N baseband signals by using N transmitters as references to obtain recovered data of the N transmitters. According to the embodiments of the present disclosure, asynchronous multi-transmitter data is received.

16 Claims, 12 Drawing Sheets

(51) Int. Cl.
| | |
|---|---|
| *H04B 7/06* | (2006.01) |
| *H04B 7/08* | (2006.01) |
| *H04B 7/0413* | (2017.01) |
| *H04B 1/7103* | (2011.01) |
| *H04W 56/00* | (2009.01) |
| *H04B 10/25* | (2013.01) |
| *H04J 11/00* | (2006.01) |

(52) U.S. Cl.
CPC ........... *H04B 7/0695* (2013.01); *H04B 7/088* (2013.01); *H04B 10/25* (2013.01); *H04L 25/03273* (2013.01); *H04L 27/01* (2013.01); *H04W 56/00* (2013.01); *H04J 11/0036* (2013.01)

(58) Field of Classification Search
CPC ..... H04B 7/0695; H04B 10/2569; H04J 4/00; H04J 13/00; H04J 14/02; H04J 14/06; H04J 14/0282; H04L 7/00; H04L 7/033; H04L 25/03273; H04L 25/03949; H04L 27/01; H04L 27/14; H04W 56/00; H04W 76/02
USPC ........ 375/219, 233, 262, 267, 316, 324, 354
See application file for complete search history.

(56) References Cited

U.S. PATENT DOCUMENTS

| | | | |
|---|---|---|---|
| 2011/0235762 A1* | 9/2011 | Cochran | H04L 7/0029 375/354 |
| 2013/0262909 A1* | 10/2013 | Yang | H04L 7/0004 713/501 |
| 2015/0078495 A1* | 3/2015 | Hossain | H04L 7/033 375/346 |
| 2017/0142764 A1 | 5/2017 | Yasukawa et al. | |

FOREIGN PATENT DOCUMENTS

| | | |
|---|---|---|
| CN | 102281222 A | 12/2011 |
| CN | 104301039 A | 1/2015 |
| EP | 2159926 A1 | 3/2010 |
| EP | 2485418 A1 | 8/2012 |
| WO | 2015/170544 A1 | 11/2015 |

OTHER PUBLICATIONS

Jeff, multiuser detection, chapter 2, retrieved from https://pdfs.semanticscholar.org/6f3e/c2db77b59154ab1b5dbe4df4ee31a66db57a.pdf, May 20, 2019, 23 pages.

* cited by examiner

METHOD FOR RECEIVING ASYNCHRONOUS-CLOCK MULTI-TRANSMITTER DATA, AND RECEIVER

CROSS-REFERENCE TO RELATED APPLICATIONS

This application is a continuation of International Application No. PCT/CN2016/103455, filed on Oct. 26, 2016, which is hereby incorporated by reference in its entirety.

TECHNICAL FIELD

Embodiments of the present disclosure relate to communications technologies, and in particular, to a method for receiving asynchronous-clock multi-transmitter data, and a receiver.

BACKGROUND

Code Division Multiple Access (CDMA) is a multipoint-to-point communications technology that develops based on a spread spectrum communications technology. A principle of the CDMA technology is based on a spreading code technology. That is, information data of a particular signal bandwidth that should be transmitted is modulated by using a high-speed spreading code whose bandwidth is far greater than the signal bandwidth, so that the bandwidth of the original information data is spread, and the original information data is modulated by using a carrier and sent out. A receiving end uses a completely identical spreading code, cooperation processing is performed on the spreading code and a received wideband signal, and the wideband signal is converted into a narrowband signal of the original information data, that is, despread, to implement information communication. Information data of CDMA multiuser signals is spread by using different spreading codes and occupies a same band, and the spreading codes are orthogonal to each other. In this way, it is ensured that no mutual interference is caused to information data transmission in a same band between users. Clock synchronization is one of key technologies and difficult problems of a CDMA system. A non-synchronous clock causes incomplete orthogonality of the spreading codes of the users and causes multi-access interference. In a commercial wireless CDMA communications system, a clock synchronization protocol is usually used, to ensure synchronous clock-based transmission between multi-users and avoid multi-access interference.

However, in a current optical fiber communications system, a transmission mode in which various points perform accessing at asynchronous clocks is usually used, an existing synchronous CDMA receiver DSP architecture cannot be applied to an asynchronous-clock CDMA system, and an existing point-to-point coherent optical communications receiver DSP architecture cannot be applied to the asynchronous-clock CDMA system either.

SUMMARY

Embodiments of the present disclosure provide a method for receiving asynchronous-clock multi-transmitter data, and a receiver, to receive asynchronous multi-transmitter data.

According to one embodiment of the present disclosure provides a receiver, including:

a first input end, N first output ends, N baseband signal recovery modules, and a multiple-input multiple-output equalization module, where each baseband signal recovery module includes a second input end and two second output ends; the second input end of each baseband signal recovery module is configured to receive a to-be-processed digital signal received by the first input end; one of the two second output ends of each baseband signal recovery module is configured to output a baseband signal, where the baseband signal is obtained by which the baseband signal recovery module processes the received to-be-processed digital signal; and the other of the two second output ends is configured to output data enabling control information, where the data enabling control information is obtained by which the baseband signal recovery module performs clock error detection on the baseband signal; and the multiple-input multiple-output equalization module includes 2N third input ends and N third output ends; each of the 2N third input ends is coupled to a corresponding second output end; each of the N third output ends is coupled to a corresponding first output end; the multiple-input multiple-output equalization module is configured to: control, based on N pieces of data enabling control information, a time sequence of N baseband signals entering the multiple-input multiple-output equalization module for equalization filtering processing, and perform equalization filtering processing on the N baseband signals using N transmitters as references to obtain recovered data of the N transmitters; and each of the N third output ends is configured to output recovered data of one transmitter, where N is a quantity of transmitters coupled to the receiver.

The receiver provided in this implementation can effectively avoid multi-access interference, thereby receiving asynchronous multi-transmitter data.

With reference to one embodiment, the multiple-input multiple-output equalization module includes N multiple-input single-output equalization modules; each of the N multiple-input single-output equalization modules is coupled to 2N third input ends; each of the N multiple-input single-output equalization modules is coupled to a corresponding third output end; and each of the N multiple-input single-output equalization modules is configured to: control, based on the N pieces of data enabling control information, a time sequence of the N baseband signals entering the multiple-input single-output equalization module for equalization filtering processing, and perform, by using one transmitter as a reference, equalization filtering processing on the N baseband signals to obtain recovered data of the transmitter.

With reference to one embodiment, each of the N multiple-input single-output equalization modules includes a control unit, N buffers, and an equalizer, where the control unit includes N fourth input ends and N fourth output ends, each of the N buffers includes a control information input end, a baseband signal input end, and a fifth output end, and the equalizer includes N sixth input ends and a sixth output end;

each of the N fourth input ends is coupled to a corresponding second output end configured to output the data enabling control information, the control information input end of each of the N buffers is coupled to a corresponding fourth output end, the baseband signal input end of each of the N buffers is coupled to a corresponding third input end, the N sixth input ends of the equalizer are coupled to corresponding fifth output ends, and the sixth output end of the equalizer is coupled to a corresponding first output end; and the control unit is configured to perform, based on the N pieces of data enabling control information, buffering control on the N buffers corresponding to the N baseband signals, so that the N baseband signals enter the equalizer in a correct time sequence for equalization filtering processing to obtain the recovered data of the transmitter.

With reference to the one embodiment, the buffer includes a random access memory (RAM), a register is disposed between the baseband signal input end and a RAM corresponding to the baseband signal input end, and each of the N baseband signals includes digital signal of a plurality of sampling time points;

the control unit is configured to:

determine N pieces of equalization filtering enabling control information based on the N pieces of data enabling control information;

determine, based on the N pieces of equalization filtering enabling control information, current valid flag count values of the N baseband signals at different time points; and determine whether there is a time point at which a difference between a current valid flag count value of a baseband signal of another transmitter other than a transmitter corresponding to recovered data output by the multiple-input single-output equalization module which the control unit belongs to and a current valid flag count value of a baseband signal of the transmitter corresponding to the recovered data output by the multiple-input single-output equalization module which the control unit belongs to is 1, and if the difference is 1, compare the current valid flag count value of the baseband signal of the another transmitter with the current valid flag count value of the baseband signal of the transmitter corresponding to the recovered data output by the multiple-input single-output equalization module which the control unit belongs to;

if the current valid flag count value of the baseband signal of the another transmitter is greater than the current valid flag count value of the baseband signal of the transmitter corresponding to the recovered data output by the multiple-input single-output equalization module which the control unit belongs to, suspend performing accumulation once on the current valid flag count value of the baseband signal of the another transmitter; or if the current valid flag count value of the baseband signal of the another transmitter is less than the current valid flag count value of the baseband signal of the transmitter corresponding to the recovered data output by the multiple-input single-output equalization module which the control unit belongs to, suspend performing accumulation once on the current valid flag count value of the baseband signal of the transmitter corresponding to the recovered data output by the multiple-input single-output equalization module which the control unit belongs to; and control, based on a current valid flag count value of each baseband signal, a write address of a RAM corresponding to the baseband signal, and control a read address of the RAM corresponding to the baseband signal by subtracting 1 from the current valid flag count value of each baseband signal, so that the digital signal of the plurality of time points enter the equalizer in a correct time sequence for equalization filtering processing to obtain the N pieces of recovered data; and the register is configured to write the digital signal of the plurality of time points into the corresponding address of the corresponding RAM at a preset period.

In this implementation, the control unit in each of the N multiple-input single-output equalization modules in the receiver controls, based on the current valid flag count values of the baseband signals of the plurality of transmitters, the time sequence of the baseband signals of the plurality of transmitters entering the equalizer for equalization filtering processing, to obtain recovered data of a transmitter that should be recovered by the multiple-input single-output equalization module, receive asynchronous multi-transmitter data, and effectively avoid multi-access interference in an equalization filtering process.

With reference to one embodiment, the equalizer includes N multipliers, a filtering coefficient calculator, and an adder;

each of the N multipliers is coupled to a corresponding sixth input end, an input end of the filtering coefficient calculator is coupled to the N sixth input ends, an output end of the filtering coefficient calculator is coupled to input ends of the N multipliers, an input end of the adder is coupled to output ends of the N multipliers, and an output end of the adder is coupled to the sixth output end;

the filtering coefficient calculator is configured to: obtain a baseband signal from each of the N buffers, and calculate, based on the baseband signal obtained from each of the N buffers, a weighting coefficient of a multiplier coupled to each of the N buffers;

each of the N multipliers is configured to perform, based on the weighting coefficient calculated by the filtering coefficient calculator, weighting processing on the baseband signal obtained from the buffer coupled to the multiplier to obtain a weighted baseband signal; and the adder is configured to add weighted baseband signals output by the N multipliers to obtain the recovered data of the transmitter.

With reference to one embodiment, the filtering coefficient calculator further includes a feedback input end, and the feedback input end is coupled to the output end of the adder.

With reference to one embodiment, each baseband signal recovery module includes an interpolation module and a despreading module coupled in series, and a clock error detection module and a timing control module coupled in series;

an input end of the interpolation module is coupled to the second input end, and an output end of the despreading module is coupled to the second output end configured to output the baseband signal;

an input end of the clock error detection module is coupled to the output end of the despreading module, and an output end of the timing control module is coupled to another input end of the interpolation module;

the clock error detection module is configured to perform clock error detection on the baseband signal to obtain clock error information;

the timing control module is configured to generate interpolation position control information and the data enabling control information based on the clock error information;

the interpolation module is configured to perform interpolation processing on the to-be-processed digital signal based on the interpolation position control information to obtain a clock recovery signal; and the despreading module is configured to perform, based on the data enabling control information and a spreading code of a transmitter corresponding to the to-be-processed digital signal, despreading processing on the clock recovery signal to obtain the baseband signal.

In this implementation, a feedback loop, formed by the clock error detection module and the timing control module, is disposed in the baseband signal recovery module in the receiver. The feedback loop provides the interpolation position control information for the interpolation module, and provides the data enabling control information for the despreading module and the multiple-input multiple-output equalization module, so that accuracy of obtaining the recovered data of the N transmitters is effectively improved, thereby receiving asynchronous multi-transmitter data.

With reference to one embodiment, the despreading module is configured to: determine despreading enabling control information based on the data enabling control information, and perform, based on the despreading enabling control information and the spreading code of the transmitter corresponding to the to-be-processed digital signal, despreading processing on the clock recovery signal to obtain the baseband signal.

With reference to one embodiment, the receiver further includes an upsampling module, an input end of the upsampling module is coupled to an analog-to-digital conversion module, and an output end of the upsampling module is coupled to the first input end; and the upsampling module is configured to sample, at a preset sampling rate, a digital signal output by the analog-to-digital conversion module to obtain the to-be-processed digital signal.

With reference to one embodiment, the receiver further includes a dispersion compensation module, the dispersion compensation module is disposed between the analog-to-digital conversion module and the first input end, and the dispersion compensation module is configured to perform dispersion compensation to obtain the to-be-processed digital signal.

In this implementation, the receiver may perform dispersion compensation by using the dispersion compensation module, thereby compensating channel dispersion.

With reference to one embodiment, the receiver further includes N carrier recovery modules, a carrier recovery module is disposed between each of the N third output ends and the corresponding first output end, and the carrier recovery module is configured to perform carrier recovery.

In this implementation, the receiver can perform carrier recovery on the recovered data of each transmitter by using the carrier recovery module, thereby compensating impact of constellation diagram rotation caused by differences of local frequency and phase between a transmitter laser and the receiver on the recovered data.

With reference to one embodiment, the receiver further includes a reference clock module, an input end of the reference clock module is coupled to the timing control module, an output end of the reference clock module is coupled to the analog-to-digital conversion module, and the reference clock module is configured to provide a clock control signal for the analog-to-digital conversion module, so that the analog-to-digital conversion module is synchronous with a to-be-processed digital signal of a transmitter corresponding to the timing control module.

According to one embodiment of the present disclosure provides a method for receiving asynchronous-clock multi-transmitter data, including:

receiving a to-be-processed digital signal, where the to-be-processed digital signal includes data sent by a plurality of transmitters;

processing, based on a preset spreading chip rate and a sampling rate of each of the plurality of transmitters, the to-be-processed digital signal to obtain a baseband signal of each transmitter and data enabling control information corresponding to the baseband signal; and controlling, based on data enabling control information of the plurality of transmitters, a time sequence of corresponding baseband signals for equalization filtering processing, and performing equalization filtering processing on the baseband signals by using the plurality of transmitters as references to obtain recovered data of each transmitter.

With reference to one embodiment, each baseband signal includes digital signal of a plurality of sampling time points, and the controlling, based on data enabling control information of the plurality of transmitters, a time sequence of corresponding baseband signals for equalization filtering processing includes:

determining, based on the data enabling control information of the plurality of transmitters, current valid flag count values of the baseband signals of the plurality of transmitters at different time points;

determining whether there is a time point at which a difference between a current valid flag count value of a baseband signal of another transmitter other than a transmitter used as a reference and a current valid flag count value of a baseband signal of the transmitter used as a reference is 1, and if the difference is 1, comparing the current valid flag count value of the baseband signal of the another transmitter with the current valid flag count value of the baseband signal of the transmitter used as a reference;

if the current valid flag count value of the baseband signal of the another transmitter is greater than the current valid flag count value of the baseband signal of the transmitter used as a reference, suspending performing accumulation once on the current valid flag count value of the baseband signal of the another transmitter; or if the current valid flag count value of the baseband signal of the another transmitter is less than the current valid flag count value of the baseband signal of the transmitter used as a reference, suspending performing accumulation once on the current valid flag count value of the baseband signal of the transmitter used as a reference; and controlling, based on a current valid flag count value of each baseband signal, a write address of a RAM corresponding to the baseband signal, and controlling a read address of the RAM corresponding to the baseband signal by subtracting 1 from the current valid flag count value of each baseband signal, so that equalization filtering processing is performed on digital signal of a plurality of time points in a correct time sequence to obtain the N pieces of recovered data.

With reference to one embodiment, the data enabling control information corresponding to the baseband signal is determined based on clock error information that is obtained by performing clock error detection on the baseband signal.

According to one embodiment of the present disclosure provides a receiver, including:

a processor, configured to: receive a to-be-processed digital signal by using a port, and process the to-be-processed digital signal to obtain N baseband signals of N transmitters and N pieces of data enabling control information corresponding to the N baseband signals, and the processor is further configured to: control, based on the N pieces of data enabling control information, a time sequence of the N baseband signals for equalization filtering processing, perform equalization filtering processing on the N baseband signals by using the N transmitters as references to obtain recovered data of the N transmitters, where N is identical to a quantity of transmitters coupled to the receiver, and N is a positive integer greater than or equal to 1.

With reference to one embodiment, the processor is configured to perform, based on the N pieces of data enabling control information, buffering control on N*N buffers corresponding to the N baseband signals, so that equalization filtering processing is performed on the N baseband signals in a correct time sequence to obtain the recovered data of the N transmitters.

With reference to one embodiment, the buffer may be a RAM, and the processor is configured to: determine N pieces of equalization filtering enabling control information based on the N pieces of data enabling control information; determine current valid flag count values of the N baseband signals at different time points based on the N pieces of equalization filtering enabling control information; and determine whether there is a time point at which a difference between a current valid flag count value of a baseband signal of another transmitter other than a transmitter used as a reference and a current valid flag count value of a baseband signal of the transmitter used as a reference is 1, and if the difference is 1, compare the current valid flag count value of the baseband signal of the another transmitter with the current valid flag count value of the baseband signal of the transmitter used as a reference;

if the current valid flag count value of the baseband signal of the another transmitter is greater than the current valid flag count value of the baseband signal of the transmitter used as a reference, suspend performing accumulation once on the current valid flag count value of the baseband signal of the another transmitter; or if the current valid flag count value of the baseband signal of the another transmitter is less than the current valid flag count value of the baseband signal of the transmitter used as a reference, suspend performing accumulation once on the current valid flag count value of the baseband signal of the transmitter used as a reference; and control, based on a current valid flag count value of each baseband signal, a write address of a RAM corresponding to the baseband signal, and control a read address of the RAM corresponding to the baseband signal by subtracting 1 from the current valid flag count value of each baseband signal, so that equalization filtering processing is performed on digital signal of a plurality of time points in a correct time sequence to obtain the N pieces of recovered data.

With reference to one embodiment, the processor is configured to perform clock error detection on the N baseband signals to obtain N pieces of clock error information; generate N pieces of interpolation position control information and the N pieces of data enabling control information based on the N pieces of clock error information; perform interpolation processing on the to-be-processed digital signal based on the N pieces of interpolation position control information to obtain N pieces of clock recovery signal; perform, based on the N pieces of data enabling control information and spreading codes of the N transmitters, despreading processing on the N pieces of clock recovery signal to obtain the N baseband signals.

With reference to one embodiment, the processor is further configured to sample, at a preset sampling rate, a digital signal output by an analog-to-digital conversion module, to obtain the to-be-processed digital signal.

With reference to one embodiment, the processor is further configured to perform dispersion compensation to obtain the to-be-processed digital signal.

With reference to one embodiment, the processor is further configured to perform carrier recovery.

With reference to one embodiment, the processor is further configured to provide a clock control signal to the analog-to-digital conversion module, so that the analog-to-digital conversion module is synchronous with the to-be-processed digital signal.

For beneficial effects of the receiver according to any of the embodiments described herein, refer to the beneficial effects described herein in the present disclosure.

According to the method for receiving asynchronous-clock multi-transmitter data and the receiver in the embodiments of the present disclosure, the receiver processes the to-be-processed digital signal by using the N baseband signal recovery modules to obtain the N baseband signals and the corresponding data enabling control information. The multiple-input multiple-output equalization module controls, based on the N pieces of data enabling control information, the time sequence of the N baseband signals entering the multiple-input multiple-output equalization module for equalization filtering processing, and performs equalization filtering processing on the N baseband signals by using the N transmitters as references to obtain the recovered data of the N transmitters. Therefore, multi-access interference can be effectively avoided, and asynchronous multi-transmitter data can be received.

BRIEF DESCRIPTION OF DRAWINGS

To describe the technical solutions in the embodiments of the present disclosure or in the prior art more clearly, the following briefly introduces the accompanying drawings required for describing the embodiments. Apparently, the accompanying drawings in the following description show some embodiments of the present disclosure, and persons of ordinary skill in the art may derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
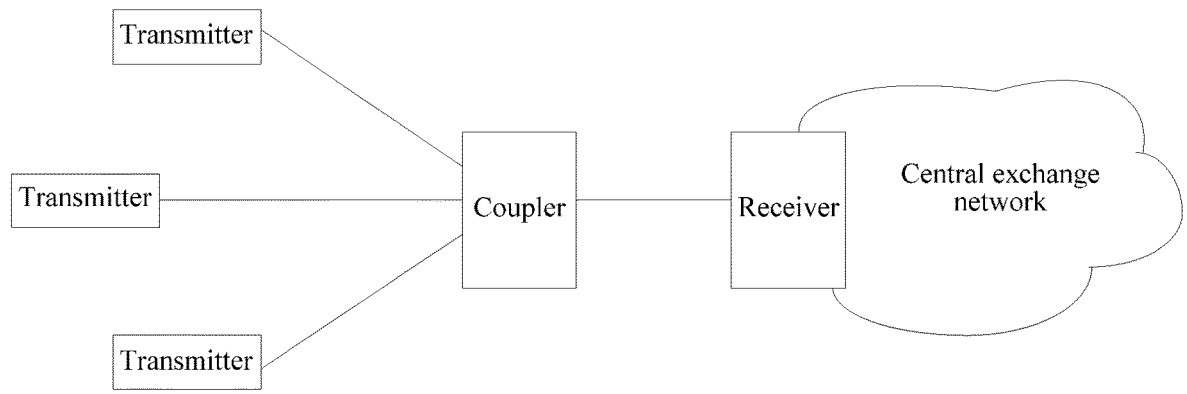
FIG. 1 is a schematic diagram of an application scenario according to the present disclosure.

FIG. 1 is a schematic diagram of an application scenario according to the present disclosure. As shown in FIG. 1, the application scenario in the embodiments of the present disclosure may be a CDMA system accessed by a plurality of users, and the plurality of users access the system shown in FIG. 1 using a transmitter in the embodiments of the present disclosure. The transmitter is used as an access node, and may receive data of a user transmitted in an uplink, and after correspondingly processing the data transmitted in an uplink, send the data of the user transmitted in an uplink to a central exchange office node by using fiber. A receiver in the embodiments of the present disclosure may be used as an ingress node that send the data of a plurality of users transmitted in an uplink to a central exchange network. As shown in FIG. 1, a coupler may further be disposed between the central exchange network and each access node, and the coupler is configured to couple optical signals of different users. The transmitter in the embodiments of the present disclosure may perform spreading processing on the data of a user transmitted in an uplink, then perform other corresponding processing on the data, and send the data to the central exchange network after performing other corresponding processing on the data. The receiver, which belongs to the central exchange network, in the embodiments of the present disclosure, receives the transmitted data. The transmitted data received by the receiver is sent by different transmitters, and clocks of the transmitters are not synchronous. The receiver in the embodiments of the present disclosure can receive asynchronous multi-transmitter data. The following describes the receiver in the embodiments of the present disclosure by using several specific embodiments.

Figure 2:
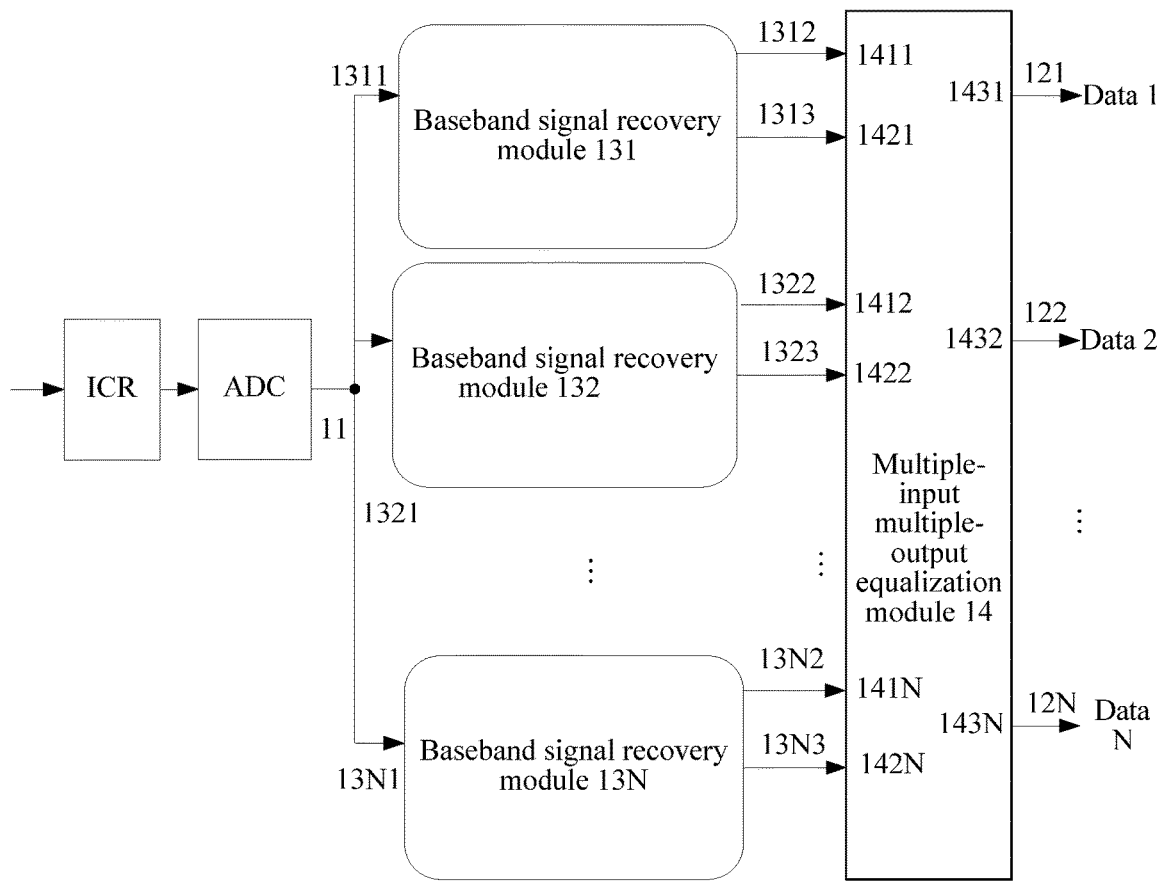
FIG. 2 is a schematic structural diagram of Embodiment 1 of a receiver according to the present disclosure.

FIG. 2 is a schematic structural diagram of Embodiment 1 of a receiver according to the present disclosure. As shown in FIG. 2, the receiver in this embodiment may include a first input end 11, N first output ends (121, 122, . . . , and 12N), N baseband signal recovery modules (131, 132, . . . , and 13N) and a multiple-input multiple-output equalization module 14. N is a positive integer greater than or equal to 1.

Each baseband signal recovery module may include a second input end and two second output ends; each second input end is configured to receive a to-be-processed digital signal received by the first input end 11; one of the two second output ends of each baseband signal recovery module is configured to output a baseband signal, where the baseband signal is obtained by which the baseband signal recovery module processes the received to-be-processed digital signal; and the other of the two second output ends is configured to output data enabling control information, where the data enabling control information is obtained by which the baseband signal recovery module performs clock error detection on the baseband signal. The baseband signal recovery module 131 is used as an example for description. The baseband signal recovery module 131 may include a second input end 1311 and two second output ends (1312 and 1313). The second output end 1312 is configured to output a baseband signal, and the second output end 1313 is configured to output data enabling control information.

Similar to the baseband signal recovery module 131, the baseband signal recovery module 132 may include a second input end 1321 and two second output ends (1322 and 1323). The second output end 1322 is configured to output a baseband signal, and the second output end 1323 is configured to output data enabling control information. The baseband signal recovery module 13N may include a second input end 13N1 and two second output ends (13N2 and 13N3). The second output end 13N2 is configured to output a baseband signal, and the second output end 13N3 is configured to output data enabling control information. It should be noted that, baseband signals output by different baseband signal recovery modules are from different transmitters. For example, the baseband signal recovery module 131 outputs a baseband signal of a transmitter 1, and the baseband signal recovery module 132 outputs a baseband signal of a transmitter 2.

The multiple-input multiple-output equalization module 14 may include $2N(2*N)$ third input ends (1411, 1412, . . . , 141N, 1421, 1422, . . . , and 142N) and N third output ends (1431, 1432, . . . , and 143N); each of the 2N third input ends is coupled to a corresponding second output end; each of the N third output ends is coupled to a corresponding first output end; the multiple-input multiple-output equalization module 14 is configured to: control, based on N pieces of data enabling control information, a time sequence of N baseband signals entering the multiple-input multiple-output equalization module for equalization filtering processing, and perform equalization filtering processing on the N baseband signals by using N transmitters as references to obtain recovered data of the N transmitters; and each of the N third output ends is configured to output recovered data of one transmitter, where N is a quantity of transmitters coupled to the receiver.

The receiver in this embodiment may further include an integrated coherent receiver (ICR) and an analog-to-digital converter (ADC). A reference clock of the ADC is in a free-run mode and does not need to be additionally controlled. A sampling rate is a specified value, and the specified value may be any value greater than sampling rates used by the baseband signal recovery modules (131, 132, . . . , and 13N) and the multiple-input multiple-output equalization module 14. The receiver in this embodiment of the present disclosure receives an optical signal, and converts the optical signal into an electrical signal through ICR coherent mixing, and then the ADC converts the electrical signal into a digital signal. The digital signal is used as a to-be-processed digital signal and input to each baseband signal recovery module from the first input end 11. Each baseband signal recovery module correspondingly processes the to-be-processed digital signal, to output a baseband signal and a piece of data enabling control information. The baseband signal recovery module 131 and the baseband signal recovery module 132 are used as examples for description. The baseband signal recovery module 131 correspondingly processes the to-be-processed digital signal received from the second input end 1311, to output a baseband signal via the second output end 1312 and output data enabling control information via the second output end 1313. The second output end 1312 is coupled to the third input end 1411, and the second output end 1313 is coupled to the third input end 1421. The baseband signal recovery module 132 correspondingly processes the to-be-processed digital signal received from the second input end 1321 to output a baseband signal via the second output end 1322 and output data enabling control information via the second output end 1323. The second output end 1322 is coupled to the third input end 1412, and the second output end 1323 is coupled to the third input end 1422. The other baseband signal recovery modules use a similar coupling manner, and details are not described herein again. The N baseband signal recovery modules (131, 132, . . . , and 13N) correspondingly process the to-be-processed digital signal to obtain N baseband signals and data enabling control information corresponding to the baseband signals, and output the N baseband signals and the data enabling control information to the multiple-input multiple-output equalization module 14. The multiple-input multiple-output equalization module 14 controls, based on the N pieces of data enabling control information, a time sequence of the N baseband signals entering the multiple-input multiple-output equalization module for equalization filtering processing, and performs equalization filtering processing on the N baseband signals using the N transmitters as references to obtain recovered data of the N transmitters. Each piece of recovered data is output by one of the first output ends. For example, recovered data Data1 is output by the first output end 121, and the recovered data Data1 is original data of the transmitter 1. Recovered data Data2 is output by the first output end 122, and the recovered data Data2 is original data of the transmitter 2. Recovered data DataN is output by the first output end 12N, and the recovered data DataN is original data of the transmitter N. In this way, asynchronous multi-transmitter data is received.

In this embodiment, the receiver obtains the N baseband signals and the corresponding data enabling control information by processing the to-be-processed digital signal using the N baseband signal recovery modules. The multiple-input multiple-output equalization module controls, based on the N pieces of data enabling control information, the time sequence of the N baseband signals entering the multiple-input multiple-output equalization module for equalization filtering processing, and performs equalization filtering processing on the N baseband signals by using the N transmitters as references to obtain the recovered data of the N transmitters. Therefore, multi-access interference can be effectively avoided, and asynchronous multi-transmitter data can be received.

Figure 3:
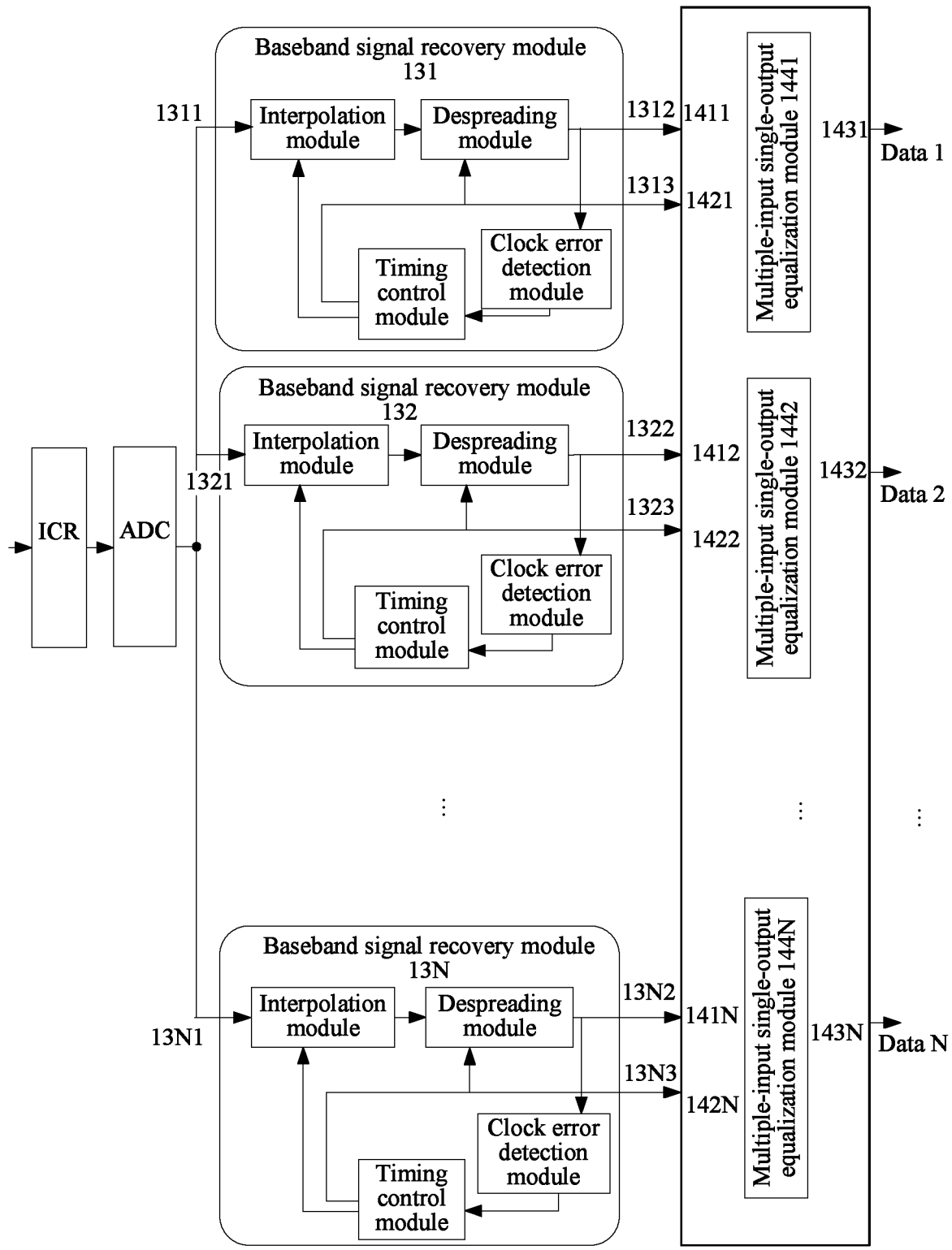
FIG. 3 is a schematic structural diagram of Embodiment 2 of a receiver according to the present disclosure.

FIG. 3 is a schematic structural diagram of Embodiment 2 of a receiver according to the present disclosure. As shown in FIG. 3, the receiver in this embodiment is based on the structure shown in FIG. 2. Further, the multiple-input multiple-output equalization module 14 may include N multiple-input single-output equalization modules (1441, 1442, . . . , and 144N); each of the N multiple-input single-output equalization modules is coupled to 2N third input ends; each of the N multiple-input single-output equalization modules is coupled to a corresponding third output end; and each of the N multiple-input single-output equalization modules is configured to: control, based on the N pieces of data enabling control information, a time sequence of the N baseband signals entering the multiple-input single-output equalization module for equalization filtering processing, and perform equalization filtering processing on the N baseband signals by using one transmitter as a reference to obtain recovered data of the transmitter.

The multiple-input single-output equalization module 1441 is coupled to the third input ends (1411, 1412, . . . , 141N, 1421, 1422, . . . , and 142N) (not shown), the multiple-input single-output equalization module 1441 is coupled to the third output end 1431, and the third output end 1431 is coupled to the first output end 121. The multiple-input single-output equalization module 1442 is coupled to the third input ends (1411, 1412, . . . , 141N, 1421, 1422, . . . , and 142N), the multiple-input single-output equalization module 1442 is coupled to the third output end 1432, and the third output end 1432 is coupled to the first output end 122. The multiple-input single-output equalization-module 144N is coupled to the third input ends (1411, 1412, . . . , 141N, 1421, 1422, . . . , and 142N), the multiple-input single-output equalization module 144N is coupled to the third output end 143N, and the third output end 143N is coupled to the first output end 12N. That is, each of the N multiple-input single-output equalization modules is configured to output recovered data of one transmitter.

Each baseband signal recovery module (131, 132, . . . , and 13N) may include an interpolation module and a despreading module coupled in series, and a clock error detection module and a timing control module coupled in series. An input end of the interpolation module is coupled to the second input end, and an output end of the despreading module is coupled to the second output end configured to output the baseband signal. An input end of the clock error detection module is coupled to the output end of the despreading module, and an output end of the timing control module is coupled to another input end of the interpolation module. Another output end of the timing control module is coupled to the second output end configured to output the data enabling control information, and coupled to another input end of the despreading module.

The clock error detection module is configured to perform clock error detection on the baseband signal to obtain clock error information. The timing control module is configured to generate interpolation position control information and the data enabling control information based on the clock error information. The interpolation module is configured to perform, based on the interpolation position control information, on the to-be-processed digital signal to obtain a clock recovery signal. The despreading module is configured to perform, based on the data enabling control information and a spreading code of a transmitter corresponding to the to-be-processed digital signal, despreading processing on the clock recovery signal to obtain the baseband signal. It may be learned that, the timing control module converts the clock error information into the interpolation position control information and the data enabling control information. The interpolation position control information is fed back to the interpolation module to control interpolation processing and obtain the clock recovery signal. The data enabling control information is fed back to the despreading module and the multiple-input multiple-output equalization module. The despreading module determines despreading enabling control information based on the data enabling control information, and performs, by using the despreading enabling control information and a corresponding spreading code, despreading processing on the clock recovery signal to obtain the baseband signal. The multiple-input multiple-output equalization module determines equalization filtering enabling control information based on the data enabling control information, and determines a current valid flag count value of a corresponding baseband signal based on the equalization filtering enabling control information. The multiple-input multiple-output equalization module 14 controls, based on current valid flag count values of the N baseband signals, a time sequence of the N baseband signals for equalization filtering processing.

The clock error detection module may perform clock error detection on the baseband signal by using an existing clock error detection algorithm in a specific implementation. The interpolation module may perform interpolation processing by using an existing interpolation algorithm such as a linear interpolation method in a specific implementation.

In this embodiment, a feedback loop formed by the clock error detection module and the timing control module is disposed in the baseband signal recovery module in the receiver. The feedback loop provides the interpolation position control information for the interpolation module, and provides the data enabling control information for the despreading module and the multiple-input multiple-output equalization module, so that accuracy of obtaining the recovered data of the N transmitters is effectively improved, thereby receiving asynchronous multi-transmitter data.

Figure 4:
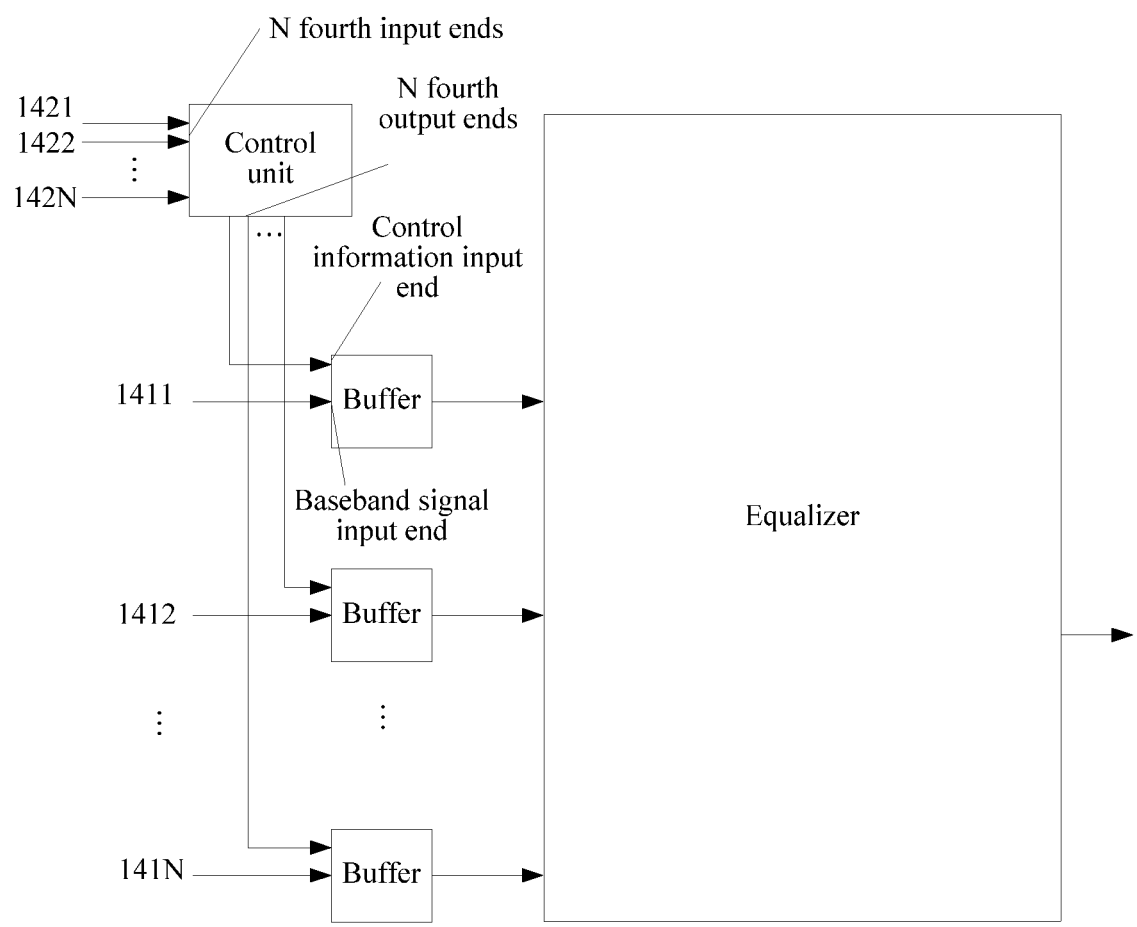
FIG. 4 is a schematic structural diagram of Embodiment 1 of a multiple-input single-output equalization module according to the present disclosure.
Figure 5:
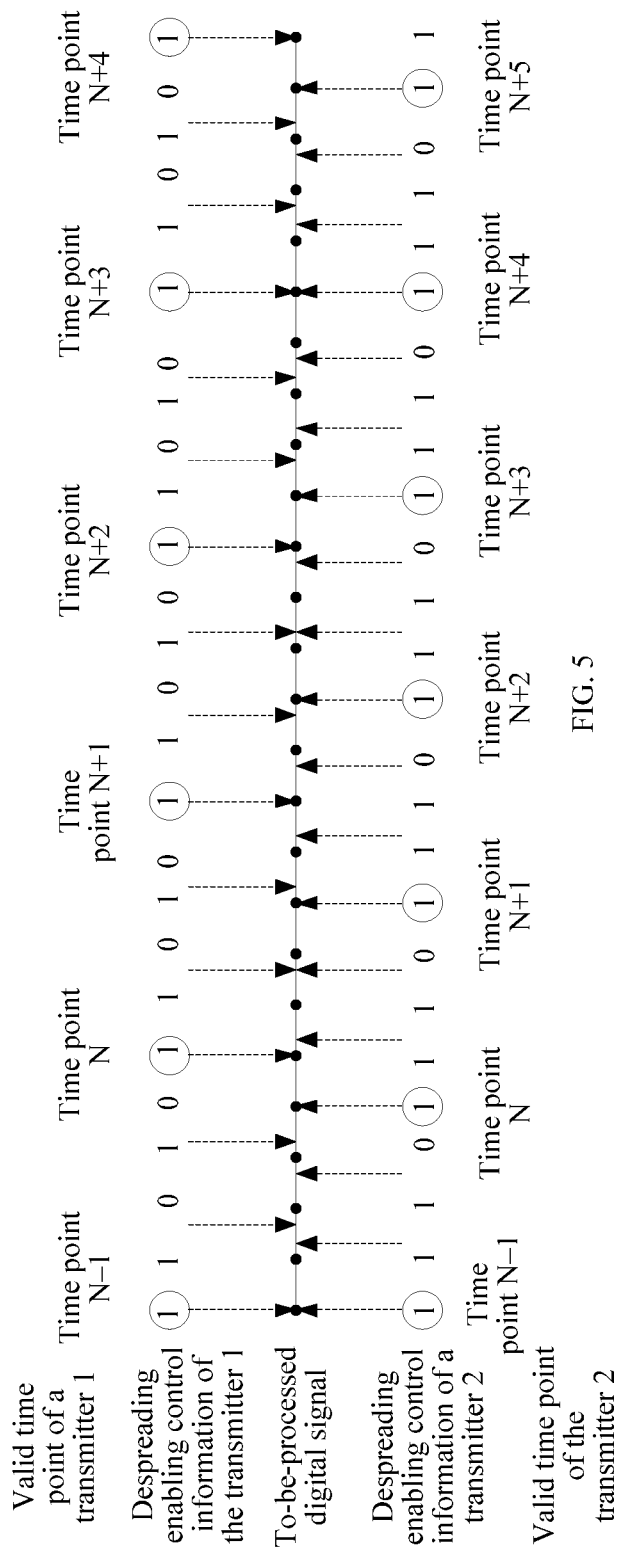
FIG. 5 is a schematic diagram of change examples of signals on which interpolation processing and despreading processing are performed by a baseband signal recovery module.
Figure 6:
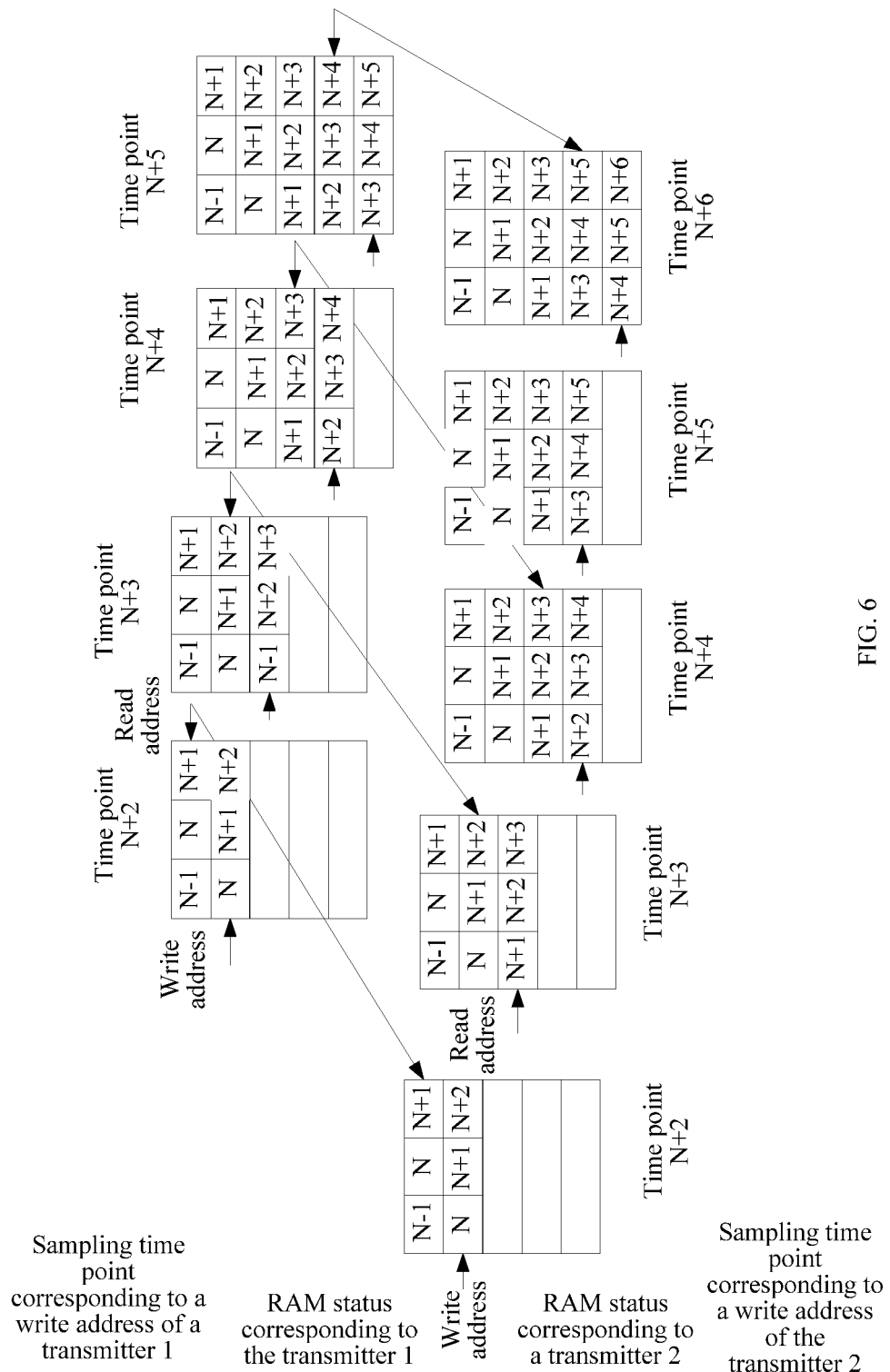
FIG. 6 is a schematic diagram of performing, by a control unit, buffering control on a buffer.

FIG. 4 is a schematic structural diagram of Embodiment 1 of a multiple-input single-output equalization module according to the present disclosure. FIG. 5 is a schematic diagram of change examples of signals on which interpolation processing and despreading processing are performed by a baseband signal recovery module. FIG. 6 is a schematic diagram of performing, by a control unit, buffering control on a buffer. As shown in FIG. 4, this embodiment is based on the structure shown in FIG. 3. Further, each of the N multiple-input single-output equalization modules may include a control unit, N buffers, and an equalizer. The control unit includes N fourth input ends and N fourth output ends, each of the N buffers includes a control information input end, a baseband signal input end, and a fifth output end, and the equalizer includes N sixth input ends and a sixth output end. Each of the N fourth input ends is coupled to a corresponding second output end that is configured to output the data enabling control information. The N fourth input ends of the control unit shown in FIG. 4 are coupled to the corresponding third input ends (1421, 1422, . . . , and 142N), and coupled to the corresponding second output end by using the third input ends (1421, 1422, . . . , and 142N), where the second output end is configured to output the data enabling control information. The control information input end of each of the N buffers is coupled to a corresponding fourth output end, and the baseband signal input end of each of the N buffers is coupled to a corresponding third input end. The baseband signal input ends of the N buffers shown in FIG. 4 are coupled to the corresponding third input ends (1411, 1412, . . . , and 141N). The N sixth input ends of the equalizer are coupled to corresponding fifth output ends, and the sixth output end of the equalizer is coupled to a corresponding first output end.

The control unit is configured to perform, based on the N pieces of data enabling control information, buffering control on buffers corresponding to the N baseband signals, so that the N baseband signals enter the equalizer in a correct time sequence for equalization filtering processing to obtain the recovered data of the transmitter.

In an optional implementation, the buffer is a random access memory RAM, a register is disposed between each baseband signal input end and a RAM corresponding to the baseband signal input end, and each baseband signal includes digital signal of a plurality of sampling time points. The control unit is configured to: determine N pieces of equalization filtering enabling control information based on the N pieces of data enabling control information; determine current valid flag count values of the N baseband signals based on the N pieces of equalization filtering enabling control information; and determine whether there is a time point at which a difference between a current valid flag count value of a baseband signal of another transmitter other than a transmitter corresponding to recovered data output by the multiple-input single-output equalization module which the control unit belongs to and a current valid flag count value of a baseband signal of the transmitter corresponding to the recovered data output by the multiple-input single-output equalization module which the control unit belongs to is 1, and if the difference is 1, compare the current valid flag count value of the baseband signal of the another transmitter with the current valid flag count value of the baseband signal of the transmitter corresponding to the recovered data output by the multiple-input single-output equalization module which the control unit belongs to; if the current valid flag count value of the baseband signal of the another transmitter is greater than the current valid flag count value of the baseband signal of the transmitter corresponding to the recovered data output by the multiple-input single-output equalization module which the control unit belongs to, suspend performing accumulation once on the current valid flag count value of the baseband signal of the another transmitter; or if the current valid flag count value of the baseband signal of the another transmitter is less than the current valid flag count value of the baseband signal of the transmitter corresponding to the recovered data output by the multiple-input single-output equalization module which the control unit belongs to, suspend performing accumulation once on the current valid flag count value of the baseband signal of the transmitter corresponding to the recovered data output by the multiple-input single-output equalization module which the control unit belongs to; and control, based on a current valid flag count value of each baseband signal, a write address of a RAM corresponding to the baseband signal, and control a read address of the RAM corresponding to the baseband signal by subtracting 1 from the current valid flag count value of each baseband signal, so that the digital signal of the plurality of time points enter the equalizer in a correct time sequence for equalization filtering processing to obtain the N pieces of recovered data; and the register is configured to write the digital signal of the plurality of time points into the corresponding address of the corresponding RAM at a preset period.

It should be noted that "a difference between A and B" in this embodiment means |A−B|.

For a clearer understanding of the foregoing implementations of the embodiments of the present disclosure, FIG. 5 and FIG. 6 are used as examples for description. Herein, data of the transmitter 1 and the transmitter 2 are used as an example for description. Recovered data of the transmitter 1 obtained by the receiver in the embodiments of the present disclosure by correspondingly processing a to-be-processed digital signal may be data 1, and recovered data of the transmitter 2 obtained by the receiver in the embodiments of the present disclosure by correspondingly processing a to-be-processed digital signal may be data 2. As shown in FIG. 5, a to-be-processed digital signal output by the ADC is represented by black dots, that is, the to-be-processed digital signal includes a signal of a plurality of sampling time points. It is assumed that a sampling rate of the to-be-processed digital signal output by the ADC is fs, and because a clock of the transmitter 1 is not synchronous with that of the transmitter 2, there is a clock error between the two transmitters. It is assumed herein that a spreading chip rate of the transmitter 1 is 3/5 fs, and a spreading chip rate of the transmitter 2 is 4/5 fs. The clock error detection module in the baseband signal recovery module 131 detects a clock error of the transmitter 1, calculates accurate sampling points represented by dashed lines in the upper part of FIG. 5, and generates data enabling control information of the transmitter 1. A representation manner of the accurate sampling points represented by the dashed lines in the upper part may be that: The to-be-processed digital signal (1, 2, 3, 4, 5, and so on) output by the ADC is sequentially marked by using a time coordinate, and then the accurate sampling points represented by the dashed lines may be represented as (1, 2.5, 4.3, 5, and so on), that is, the interpolation position control information. The interpolation module in the baseband signal recovery module 131 performs, based on the interpolation position control information (1, 2.5, 4.3, 5, and so on), interpolation processing on the to-be-processed digital signal output by the ADC, to obtain clock recovery information. The data enabling control information of the transmitter 1 may be 21010210102101021010210102101021010. The despreading module in the baseband signal recovery module 131 determines, based on the data enabling control information 21010210102101021010210102101021010, that despreading enabling control information is 11010110101101011010110101101011010 shown in FIG. 5. The despreading module performs, based on the despreading enabling control information 11010110101101011010110101101011010 and a spreading code of the transmitter 1, despreading on the clock recovery signal output by the interpolation module in the baseband signal recovery module 131, to obtain a baseband signal. The baseband signal and the data enabling control information 21010210102101021010210102101021010 are input to the multiple-input single-output equalization module 141. The baseband signal first enters the register in the multiple-input single-output equalization module 141, and is written into a corresponding RAM at a preset period. A write address of the RAM is controlled based on the data enabling control information. The control unit determines equalization filtering enabling control information based on the data enabling control information 21010210102101021010210102101021010. The equalization filtering enabling control information obtained herein is 10000100001000010000100001000010000. As shown in FIG. 5, circled positions are 1, and the rest is 0. Then, current valid flag count values of the baseband signal at different time points are determined based on the equalization filtering enabling control information 10000100001000010000100001000010000. As shown in FIG. 5, assuming that a current valid flag count value at a time point N−1 is N−1, a current valid flag count value at a time point N is N, a current valid flag count value at a time point N+1 is N+1, and by analogy, a current valid flag count value at a time point N+4 is N+4. Similarly, the clock error detection module in the baseband signal recovery module 132 detects a clock error of the transmitter 2, calculates accurate sampling points represented by dashed lines in the lower part of FIG. 5, and generates data enabling control information of the transmitter 2. A representation manner of the accurate sampling points represented by the dashed lines in the lower part may be that: The accurate sampling points represented by the dashed lines in the lower part may be represented as (1, 2.3, 3.6, 5, and so on), that is, the interpolation position control information. The interpolation module in the baseband signal recovery module 132 performs, based on the interpolation position control information (1, 2.3, 3.6, 5, and so on), interpolation processing on the to-be-processed digital signal output by the ADC, to obtain clock recovery information. The data enabling control information of the transmitter 2 may be 21102110211021102110211021102110. The despreading module in the baseband signal recovery module 132 determines, based on the data enabling control information 21102110211021102110211021102110, that despreading enabling control information is 11101110111011101110111011101110 shown in FIG. 5. The despreading module performs, based on the despreading enabling control information 11101110111011101110111011101110 and a spreading code of the transmitter 2, despreading on the clock recovery signal output by the interpolation module in the baseband signal recovery module 132, to obtain a baseband signal. The baseband signal and the data enabling control information 21102110211021102110211021102110 are input to the multiple-input single-output equalization module 141. The baseband signal first enters the register in the multiple-input single-output equalization module 141, and is written into a corresponding RAM at a preset period. A write address of the RAM is controlled based on the data enabling control information. The control unit determines equalization filtering enabling control information based on the data enabling control information 21102110211021102110211021102110. The equalization filtering enabling control information obtained herein is 10001000100010001000100010001000. As shown in FIG. 5, circled positions are 1, and the rest is 0. Then, current valid flag count values of the baseband signal at different time points are determined based on the equalization filtering enabling control information 10001000100010001000100010001000. As shown in FIG. 5, assuming that a current valid flag count value at a time point N−1 is N−1, a current valid flag count value at a time point N is N, a current valid flag count value at a time point N+1 is N+1, and by analogy, a current valid flag count value at a time point N+4 is N+4. To receive asynchronous transmitter data, the receiver in the embodiments of the present disclosure should perform multi-access interference compensation by using the multiple-input multiple-output equalization module. It is assumed that a signal of the transmitter 1 at the time point N should correspond to signals of the transmitter 2 at three time points in total (that is, time points, N−1, N, and N+1, of the transmitter 2) to eliminate crosstalk. However, due to impact of an asynchronous clock, as shown in FIG. 5, at a time point N+4 of the transmitter 1, signals of the transmitter 2 at three time points corresponding to the time point N+4 of the transmitter 1 are at time points N+4, N+5, and N+6 of the transmitter 2. However, signals that actually enter the multiple-input multiple-output equalization module correspond to signals of time points N+3, N+4, and N+5, and walk-off occurs. Therefore, the receiver in this embodiment of the present disclosure is used to control, by using the equalization filtering enabling control information corresponding to each transmitter, a time sequence of signals on which filtering processing has been performed by the MIMO equalization module, to avoid that after the walk-off phenomenon deflects from a compensated time zone range, a correct filtering coefficient cannot be obtained and multi-access interference cannot be compensated. The multiple-input single-output equalization module 141 is further used as an example for description. The multiple-input single-output equalization module 141 of the receiver in the embodiments of the present disclosure outputs recovered data of the transmitter 1, and then in an equalization filtering process, the transmitter 1 is used as a reference. It is determined whether there is a time point at which a difference between a current valid flag count value of the transmitter 1 and a current valid flag count value of the transmitter 2 is 1. It can be learned from FIG. 5 that, a difference between a current valid flag count value of a baseband signal of the transmitter 1 at the time point N+3 and a current valid flag count value of a baseband signal of the transmitter 2 at the time point N+4 is 1, and therefore, the current valid flag count value of the transmitter 2 is suspended to be accumulated once. For details, refer to FIG. 6. Digital signal of three time points are written in an address of a RAM in FIG. 6. The write address of the RAM is based on the current valid flag count value, and a read address of the RAM is based on the current valid flag count value −1. It can be learned from FIG. 6 that, current valid flag count values of baseband signals of the two transmitters are increased by 1 at a time point N+2 and a time point N+3; however, the current valid flag count value of the baseband signal of the transmitter 1 is increased by 1 at a time point N+4, and the current valid flag count value of the baseband signal of the transmitter 2 is not increased by 1. In this way, a time sequence of the baseband signals for equalization filtering processing is controlled and the recovered data of the transmitter 1 is obtained.

In this embodiment, the control unit in each of the N multiple-input single-output equalization modules in the receiver controls, based on the current valid flag count values of the baseband signals of the plurality of transmitters, the time sequence of the baseband signals of the plurality of transmitters entering the equalizer for equalization filtering processing, to obtain recovered data of a transmitter that should be recovered by the multiple-input single-output equalization module, receive asynchronous multi-transmitter data, and effectively avoid multi-access interference in an equalization filtering process.

Figure 7:
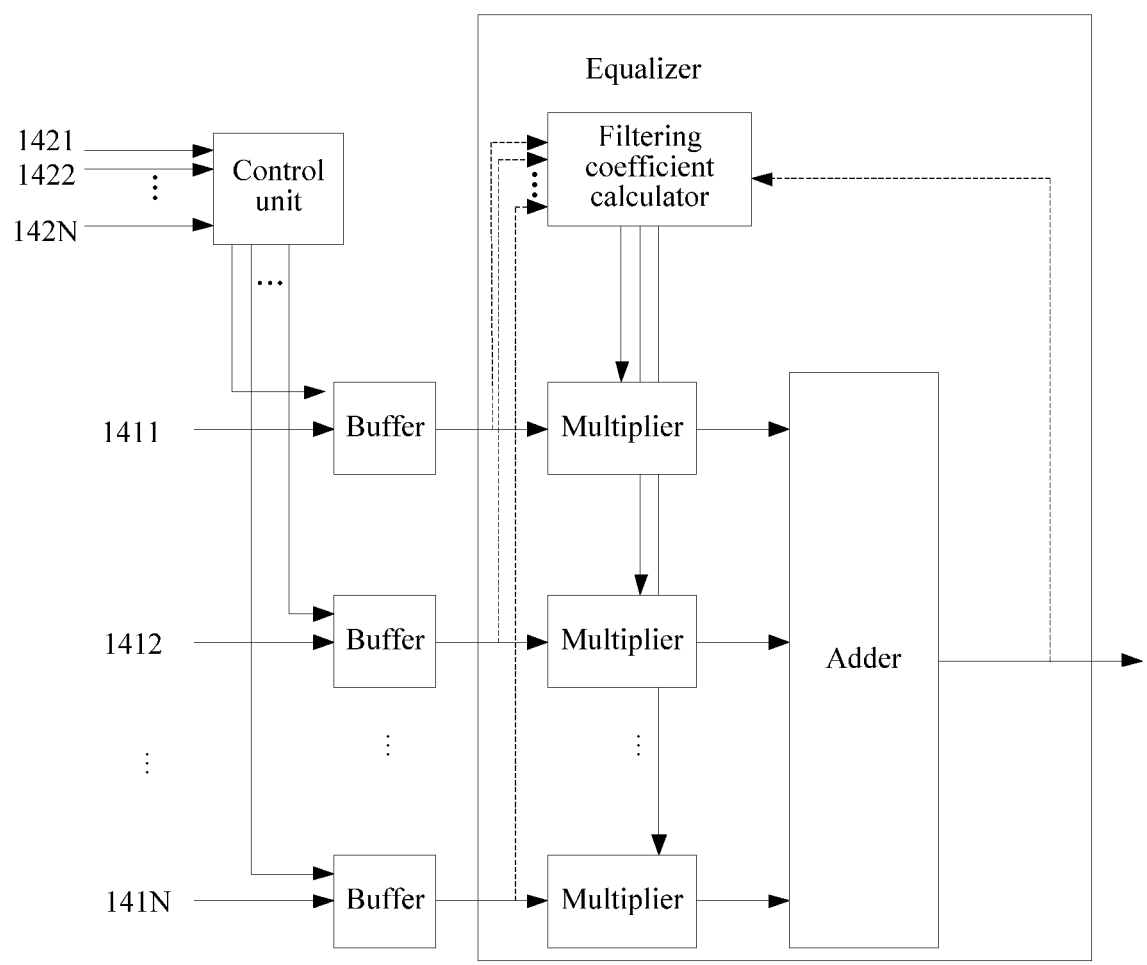
FIG. 7 is a schematic structural diagram of Embodiment 2 of a multiple-input single-output equalization module according to the present disclosure.

FIG. 7 is a schematic structural diagram of Embodiment 2 of a multiple-input single-output equalization module according to the present disclosure. As shown in FIG. 7, this embodiment is based on the structure shown in FIG. 4. Further, the equalizer includes N multipliers, a filtering coefficient calculator, and an adder.

Each of the N multipliers is coupled to a corresponding sixth input end. An input end of the filtering coefficient calculator is coupled to the N sixth input ends. An output end of the filtering coefficient calculator is coupled to input ends of the N multipliers. An input end of the adder is coupled to output ends of the N multipliers. An output end of the adder is coupled to the sixth output end. The filtering coefficient calculator is configured to: obtain a baseband signal from each of the N buffers, and calculate, based on the baseband signal obtained from each of the N buffers, a weighting coefficient of a multiplier coupled to each of the N buffers. Each of the N multipliers is configured to perform, based on the weighting coefficient calculated by the filtering coefficient calculator, weighting processing on the baseband signal obtained from the buffer coupled to the multiplier to obtain a weighted baseband signal. The adder is configured to add weighted baseband signals output by the N multipliers, to obtain the recovered data of the transmitter.

Optionally, the filtering coefficient calculator further includes a feedback input end. The feedback input end is coupled to the output end of the adder.

The equalizers in the multiple-input single-output equalization modules have a same structure, and a difference of the multiple-input single-output equalization modules lies in that time sequences that are controlled by the control unit and that are of the baseband signals of the plurality of transmitters entering the equalizer for equalization filtering processing are different.

Figure 8:
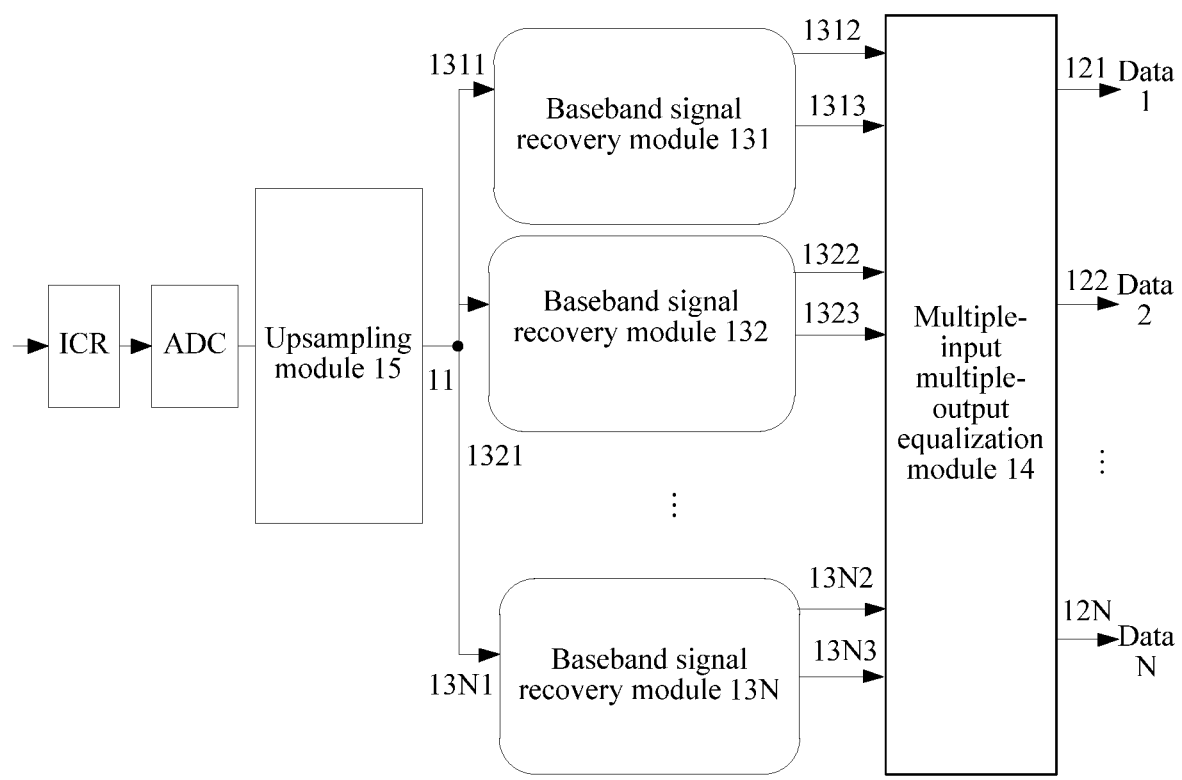
FIG. 8 is a schematic structural diagram of Embodiment 3 of a receiver according to the present disclosure.

FIG. 8 is a schematic structural diagram of Embodiment 3 of a receiver according to the present disclosure. As shown in FIG. 8, this embodiment is based on the structure of the receiver according to any of the embodiments in FIG. 2 to FIG. 7. Further, the receiver may further include an upsampling module 15, an input end of the upsampling module 15 is coupled to an analog-to-digital conversion module ADC, and an output end of the upsampling module 15 is coupled to the first input end 11. The upsampling module 15 is configured to sample, at a preset sampling rate, a digital signal output by the analog-to-digital conversion module, to obtain the to-be-processed digital signal.

The sampling rate of the analog-to-digital conversion module ADC may be any value. The upsampling module 15 in this embodiment performs upsampling at a specified value, to satisfy a sampling rate used by the multiple-input multiple-output equalization module 14. The upsampling module 15 may implement upsampling by using a conventional method, and may use a time domain or frequency domain interpolation method.

Figure 9:
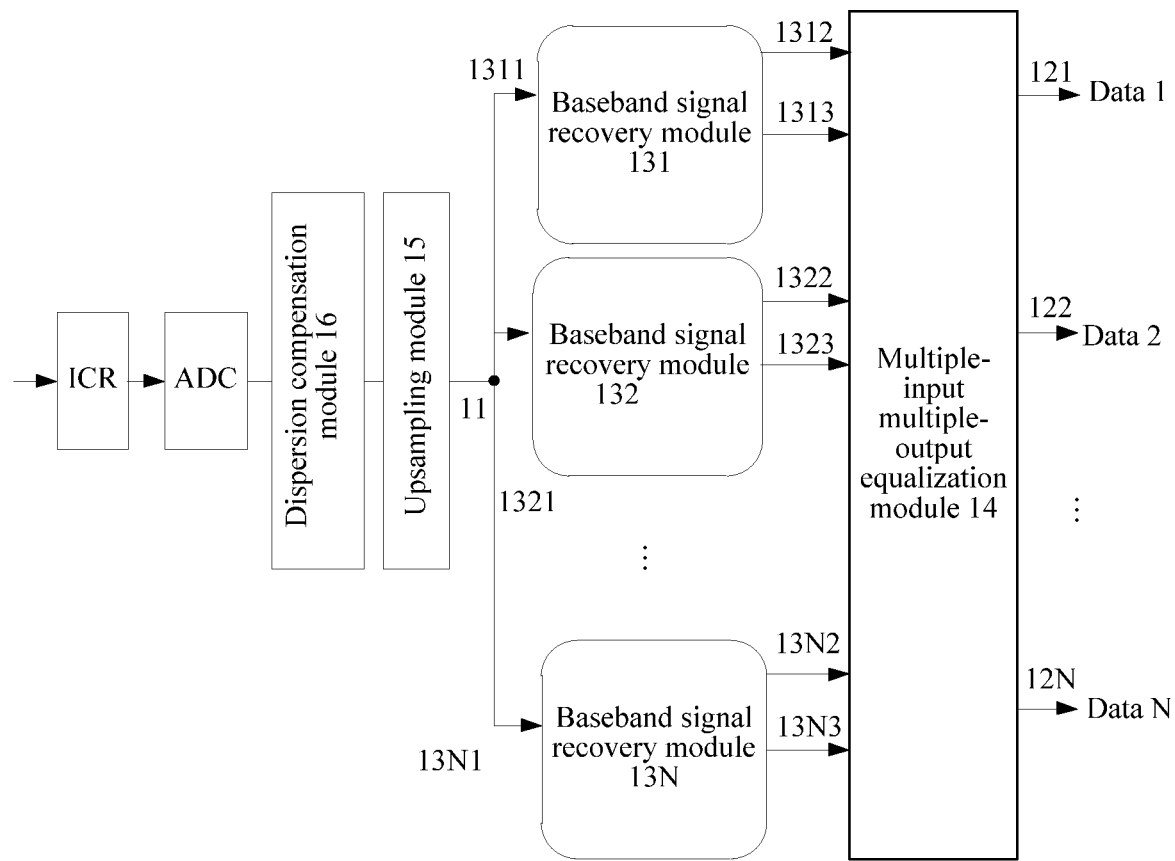
FIG. 9 is a schematic structural diagram of Embodiment 4 of a receiver according to the present disclosure.

FIG. 9 is a schematic structural diagram of Embodiment 4 of a receiver according to the present disclosure. As shown in FIG. 9, this embodiment is based on the structure of the receiver according to any of the embodiments in FIG. 2 to FIG. 8. Further, the receiver may further include a dispersion compensation module 16, the dispersion compensation module 16 is disposed between the analog-to-digital conversion module ADC and the first input end 11, and the dispersion compensation module 16 is configured to perform dispersion compensation to obtain the to-be-processed digital signal.

In this embodiment, the receiver can perform dispersion compensation using the dispersion compensation module, thereby compensating channel dispersion.

Figure 10:
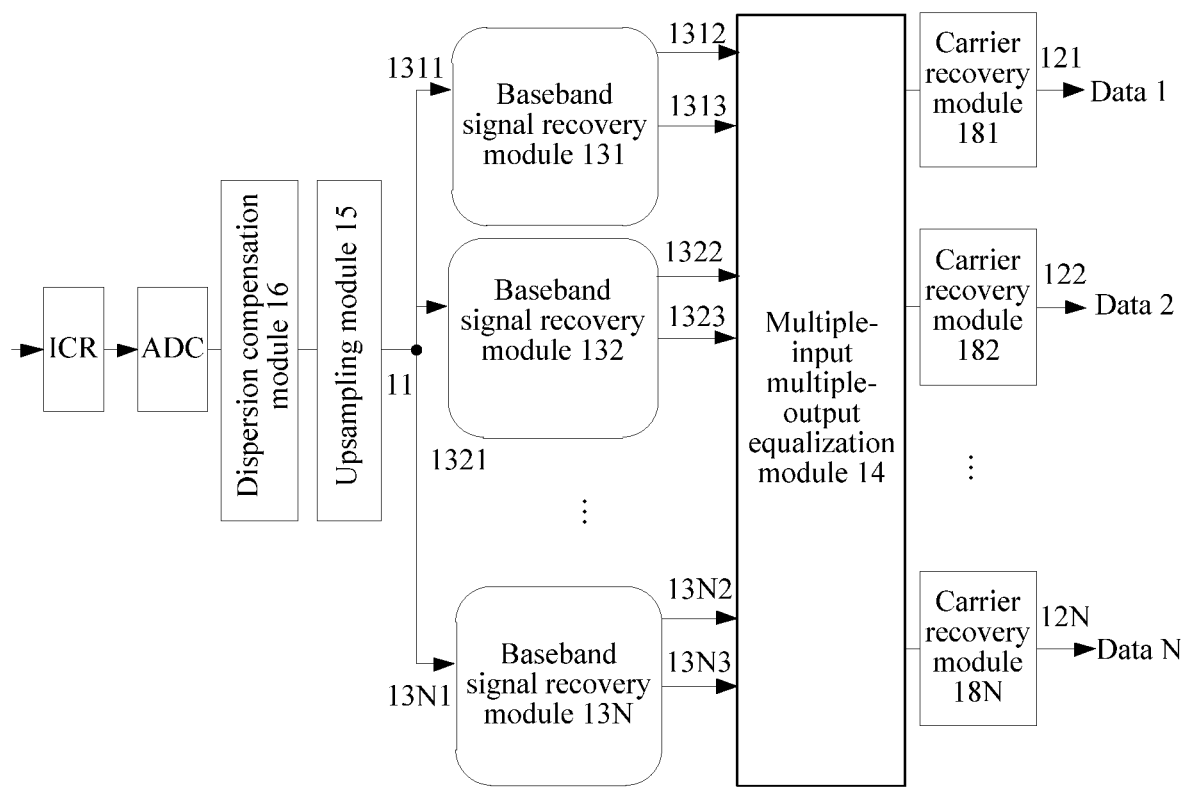
FIG. 10 is a schematic structural diagram of Embodiment 5 of a receiver according to the present disclosure.

FIG. 10 is a schematic structural diagram of Embodiment 5 of a receiver according to the present disclosure. As shown in FIG. 10, this embodiment is based on the structure of the receiver according to any of the embodiments in FIG. 2 to FIG. 9. Further, the receiver may further include N carrier recovery modules (181, 182, . . . , and 18N). one of the N carrier recovery modules is disposed between each of the N third output ends and the corresponding first output end, and the carrier recovery module is configured to perform carrier recovery.

In this embodiment, the receiver can perform carrier recovery on the recovered data of each transmitter by using the carrier recovery module, thereby compensating impact of constellation diagram rotation caused by local frequency and phase differences between a transmitter laser and the receiver on the recovered data.

Figure 11:
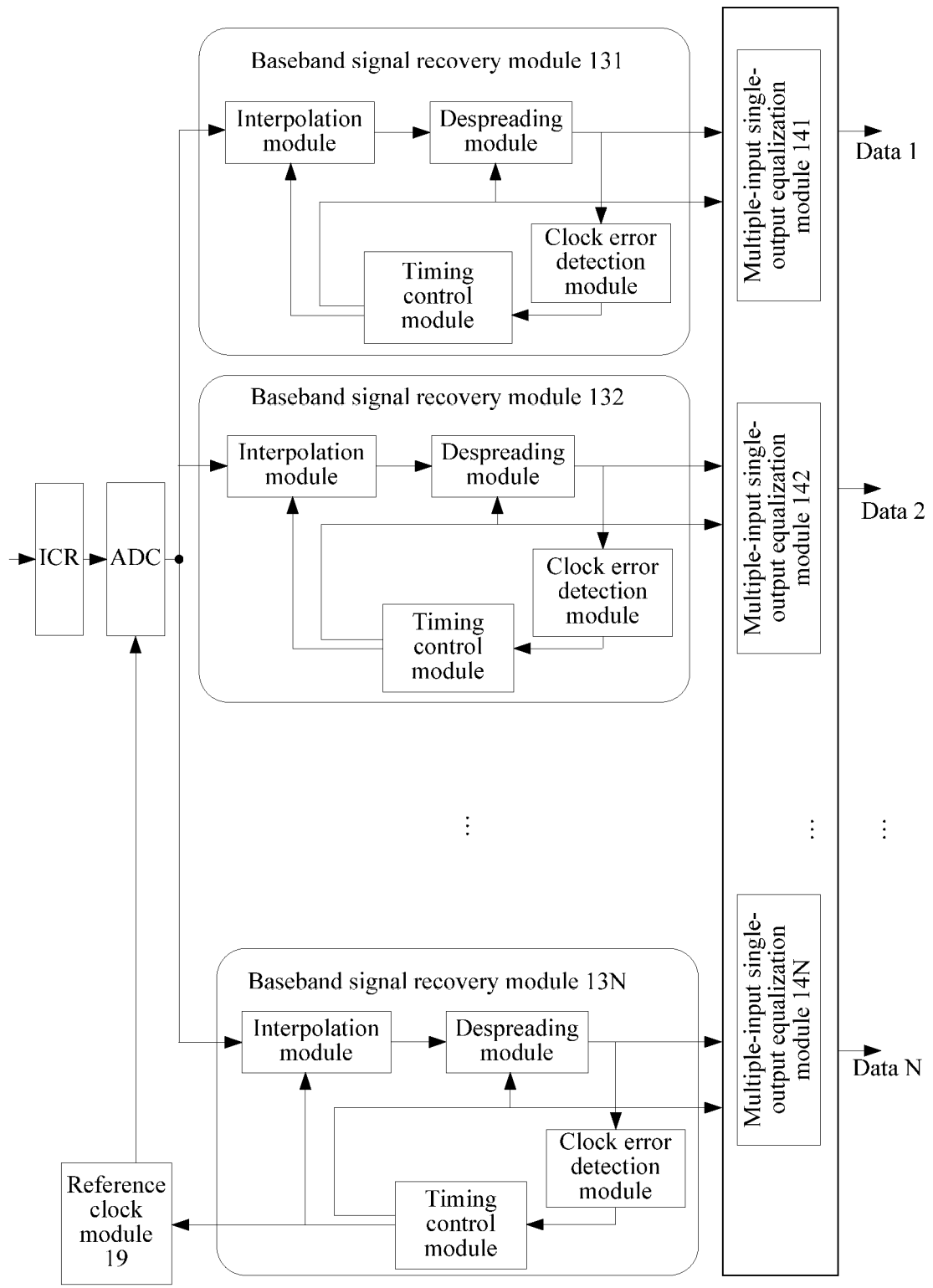
FIG. 11 is a schematic structural diagram of Embodiment 6 of a receiver according to the present disclosure.

FIG. 11 is a schematic structural diagram of Embodiment 6 of a receiver according to the present disclosure. As shown in FIG. 11, this embodiment is based on the structure of the receiver according to any of the embodiments in FIG. 2 to FIG. 10. Further, the receiver may further include a reference clock module 19. An input end of the reference clock module 19 is coupled to the timing control module. The timing control module may be any timing control module in the baseband signal recovery module. An output end of the reference clock module 19 is coupled to the analog-to-digital conversion module ADC. The reference clock module 19 is configured to provide a clock control signal for the analog-to-digital conversion module ADC, so that the analog-to-digital conversion module ADC is synchronous with a to-be-processed digital signal of a transmitter corresponding to the timing control module.

According to the receiver in this embodiment, the reference clock module may be disposed. The reference clock module is coupled to a timing control module in a baseband signal recovery module, so that based on a feedback signal in the timing control module in the baseband signal recovery module, the reference clock module may be synchronous with a signal of a transmitter corresponding to the baseband signal recovery module.

Figure 12:
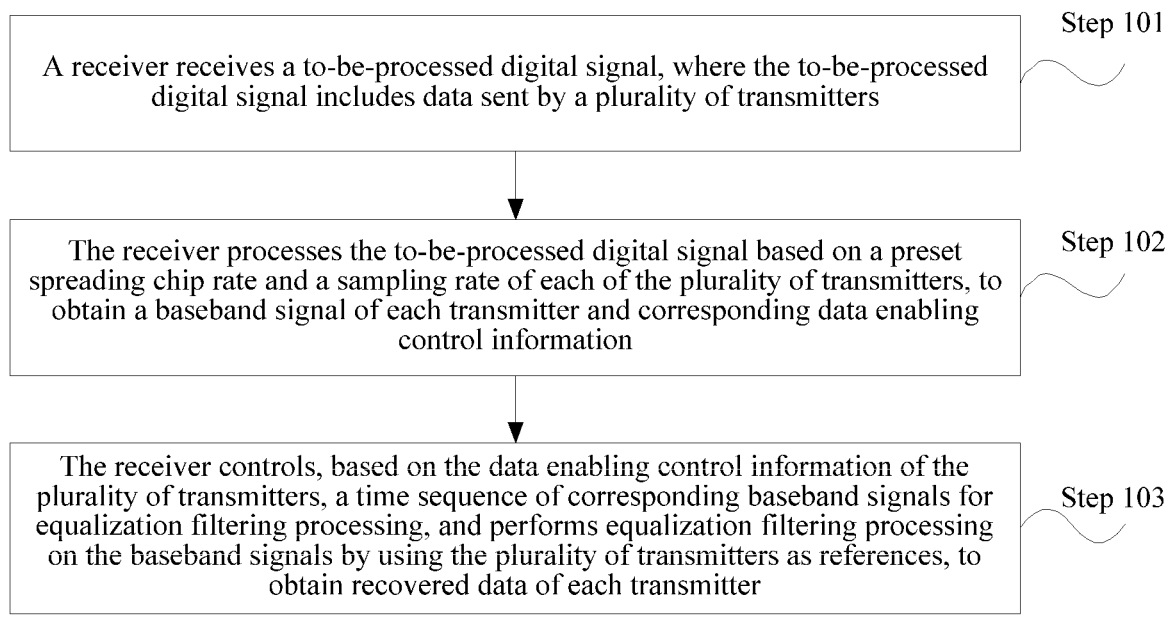
FIG. 12 is a flowchart of Embodiment 1 of a method for receiving asynchronous-clock multi-transmitter data according to the present disclosure.

FIG. 12 is a flowchart of Embodiment 1 of a method for receiving asynchronous-clock multi-transmitter data according to the present disclosure. As shown in FIG. 12, the method in this embodiment may include the following actions, operations, or blocks.

Block 101. A receiver receives a to-be-processed digital signal, where the to-be-processed digital signal includes data sent by a plurality of transmitters.

Block 102. The receiver processes, based on a preset spreading chip rate and a sampling rate of each of the plurality of transmitters, the to-be-processed digital signal to obtain a baseband signal of each transmitter and corresponding data enabling control information.

Block 103. The receiver controls, based on the data enabling control information of the plurality of transmitters, a time sequence of corresponding baseband signals for equalization filtering processing, and performs, by using the plurality of transmitters as references, equalization filtering processing on the baseband signals to obtain recovered data of each transmitter. In this embodiment, the receiver receives the to-be-processed digital signal. The receiver processes the to-be-processed digital signal based on the preset spreading chip rate and the sampling rate of each of the plurality of transmitters, to obtain the baseband signal of each transmitter and the corresponding data enabling control information. The receiver controls, based on the data enabling control information of the plurality of transmitters, the time sequence of corresponding baseband signals for equalization filtering processing. The receiver performs, by using the plurality of transmitters as references, equalization filtering processing on the baseband signals to obtain the recovered data of each transmitter. Therefore, multi-access interference can be effectively avoided and asynchronous multi-transmitter data can be received.

Figure 13:
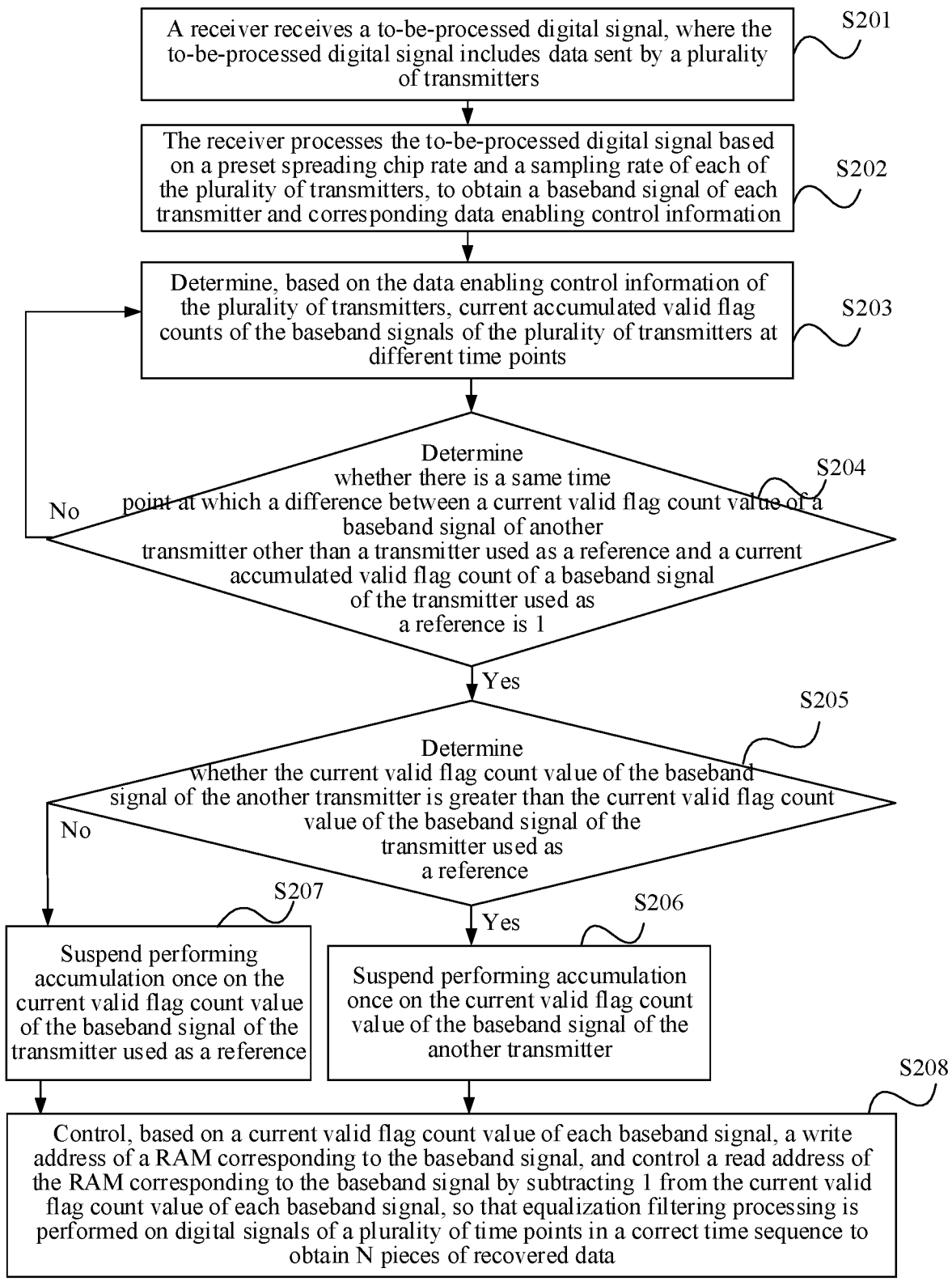
FIG. 13 is a flowchart of Embodiment 2 of a method for receiving asynchronous-clock multi-transmitter data according to the present disclosure.

FIG. 13 is a flowchart of Embodiment 2 of a method for receiving asynchronous-clock multi-transmitter data according to the present disclosure. As shown in FIG. 13, the method in this embodiment may include the following actions, operations, or blocks.

Block 201. A receiver receives a to-be-processed digital signal, where the to-be-processed digital signal includes data sent by a plurality of transmitters.

Block 202. The receiver processes, based on a preset spreading chip rate and a sampling rate of each of the plurality of transmitters, the to-be-processed digital signal to obtain a baseband signal of each transmitter and corresponding data enabling control information.

Block 203. Determine, based on the data enabling control information of the plurality of transmitters, current valid flag count values of the baseband signals of the plurality of transmitters at different time points.

Block 204. Determine whether there is a time point at which a difference between a current valid flag count value of a baseband signal of another transmitter other than a transmitter used as a reference and a current valid flag count value of a baseband signal of the transmitter used as a reference is 1; and if the difference is 1, perform block 205, or otherwise, perform block 203.

Block 205. Determine whether the current valid flag count value of the baseband signal of the another transmitter is greater than the current valid flag count value of the baseband signal of the transmitter used as a reference, and if the difference is 1, perform block 206, or otherwise, perform block 207.

Block 206. Suspend performing accumulation once on the current valid flag count value of the baseband signal of the another transmitter.

Block 207. Suspend performing accumulation once on the current valid flag count value of the baseband signal of the transmitter used as a reference.

Block 208. Control, based on a current valid flag count value of each baseband signal, a write address of a RAM corresponding to the baseband signal, and control a read address of the RAM corresponding to the baseband signal by subtracting 1 from the current valid flag count value of each baseband signal, so that equalization filtering processing is performed on digital signal of a plurality of time points in a correct time sequence to obtain N pieces of recovered data.

In this embodiment, the write address of the RAM corresponding to the baseband signal is controlled based on the current valid flag count value of each baseband signal, and the read address of the RAM corresponding to the baseband signal is controlled by subtracting 1 from the current valid flag count value of each baseband signal, so that equalization filtering processing is performed on the digital signal of the plurality of time points in the correct time sequence to obtain the recovered data of the N transmitters. Therefore, multi-access interference can be effectively avoided, and asynchronous multi-transmitter data can be received.

It should be noted that, each functional module in the receiver in the foregoing embodiments of the present disclosure may correspond to one or more processors of the receiver. An input end and an output end of each functional module may correspond to a port of the processor. The processor herein may be a central processing unit (CPU) or an application-specific integrated circuit (ASIC), or may be one or more integrated circuits configured to implement this embodiment of the present disclosure. It may be understood that, the receiver may further include a receiver, a transmitter, and a memory. The memory is configured to store instruction code. The processor invokes the instruction code in the memory to control the receiver and the transmitter, so that the receiver performs the foregoing operations.

In the several embodiments provided in the present disclosure, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor (processor) to perform some of the actions, operations, blocks, etc., of the methods described in the embodiments of the present disclosure. The foregoing storage medium includes: any medium that can store program code, such as a USB flash drive, a removable hard disk, a read-only memory (ROM), a random access memory (RAM), a magnetic disk, or a compact disc.

It may be clearly understood by persons skilled in the art that, for the purpose of convenient and brief description, division of the foregoing function modules is taken as an example for illustration. In actual application, the foregoing functions can be allocated to different function modules and implemented based on a requirement, that is, an inner structure of an apparatus is divided into different function modules to implement all or some of the functions described above. For a detailed working process of the foregoing apparatus, refer to a corresponding process in the foregoing method embodiments, and details are not described herein again.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A receiver, comprising:
a first input end, N first output ends, N baseband signal recovery circuits, and a multiple-input multiple-output equalization circuit, wherein:
each baseband signal recovery circuit comprises a second input end and two second output ends; the second input end of each baseband signal recovery circuit is configured to receive a to-be-processed digital signal received by the first input end; one of the two second output ends of each baseband signal recovery circuit is configured to output a baseband signal, wherein the baseband signal is obtained by the baseband signal recovery circuit which processes the to-be-processed digital signal; the other of the two second output ends is configured to output data enabling control information, wherein the data enabling control information is obtained by the baseband signal recovery circuit which performs clock error detection on the baseband signal; and
the multiple-input multiple-output equalization circuit comprises 2N third input ends and N third output ends; each of the 2N third input ends is coupled to a corresponding second output end; each of the N third output ends is coupled to a corresponding first output end; the multiple-input multiple-output equalization circuit is configured to: control, based on N pieces of data enabling control information, a time sequence of N baseband signals provided to the multiple-input multiple-output equalization circuit for equalization filtering processing, and perform the equalization filtering processing on the N baseband signals utilizing N transmitters as references to obtain recovered data of the N transmitters; each of the N third output ends is configured to output recovered data of one transmitter; and N is equal to a quantity of transmitters coupled to the receiver, and N is a positive integer greater than 1.

2. The receiver according to claim 1, wherein: the multiple-input multiple-output equalization circuit comprises N multiple-input single-output equalization circuits; each of the N multiple-input single-output equalization circuits is coupled to the 2N third input ends; each of the N multiple-input single-output equalization circuits is coupled to a corresponding third output end; and each of the N multiple-input single-output equalization circuits is configured to: control, based on the N pieces of data enabling control information, the time sequence of the N baseband signals provided to the multiple-input single-output equalization circuit for equalization filtering processing, and perform, by utilizing one transmitter as a reference, the equalization filtering processing on the N baseband signals to obtain recovered data of the transmitter.

3. The receiver according to claim 2, wherein: each of the N multiple-input single-output equalization circuits comprises a control circuit, N buffers, and an equalizer;
the control circuit comprises N fourth input ends and N fourth output ends, each of the N buffers comprises a control information input end, a baseband signal input end, and a fifth output end, and the equalizer comprises N sixth input ends and a sixth output end;
each of the N fourth input ends is coupled to a corresponding second output end configured to output the data enabling control information, the control information input end of each of the N buffers is coupled to a corresponding fourth output end, the baseband signal input end of each of the N buffers is coupled to a corresponding third input end, the N sixth input ends of the equalizer are coupled to corresponding fifth output ends, and the sixth output end of the equalizer is coupled to a corresponding first output end; and
the control circuit is configured to perform, based on the N pieces of data enabling control information, buffering control on the N buffers corresponding to the N baseband signals, wherein the N baseband signals are provided to the equalizer in a correct time sequence for the equalization filtering processing to obtain the recovered data of the transmitter.

4. The receiver according to claim 3, wherein a buffer of the N buffers comprises a random access memory (RAM), a register is disposed between the baseband signal input end and the RAM corresponding to the baseband signal input end, and each of the N baseband signals comprises digital signal of a plurality of sampling time points;
the control circuit is configured to:
determine N pieces of equalization filtering enabling control information based on the N pieces of data enabling control information;
determine, based on the N pieces of equalization filtering enabling control information, current valid flag count values of the N baseband signals at different time points; and
determine whether there is a time point at which a difference between a current valid flag count value of a baseband signal of another transmitter other than a transmitter corresponding to recovered data output by the multiple-input single-output equalization circuit which the control circuit belongs to and a current valid flag count value of a baseband signal of the transmitter corresponding to the recovered data output by the multiple-input single-output equalization circuit which the control circuit belongs to is 1, and if the difference is 1, compare the current valid flag count value of the baseband signal of the another transmitter with the current valid flag count value of the baseband signal of the transmitter corresponding to the recovered data output by the multiple-input single-output equalization circuit which the control circuit belongs to;

if the current valid flag count value of the baseband signal of the another transmitter is greater than the current valid flag count value of the baseband signal of the transmitter corresponding to the recovered data output by the multiple-input single-output equalization circuit which the control circuit belongs to, suspend performing accumulation once on the current valid flag count value of the baseband signal of the another transmitter;

if the current valid flag count value of the baseband signal of the another transmitter is less than the current valid flag count value of the baseband signal of the transmitter corresponding to the recovered data output by the multiple-input single-output equalization circuit which the control circuit belongs to, suspend performing accumulation once on the current valid flag count value of the baseband signal of the transmitter corresponding to the recovered data output by the multiple-input single-output equalization circuit which the control circuit belongs to; and control, based on a current valid flag count value of each baseband signal, a write address of the RAM corresponding to the baseband signal, and control a read address of the RAM corresponding to the baseband signal by subtracting 1 from the current valid flag count value of each baseband signal, wherein the digital signal of the plurality of time points provided to the equalizer in a correct time sequence for the equalization filtering processing to obtain the N pieces of recovered data; and wherein the register is configured to write the digital signal of the plurality of time points into the corresponding address of the corresponding RAM at a preset period.

5. The receiver according to claim 3, wherein:

the equalizer comprises N multipliers, a filtering coefficient calculator, and an adder;

each of the N multipliers is coupled to a corresponding sixth input end, an input end of the filtering coefficient calculator is coupled to the N sixth input ends, an output end of the filtering coefficient calculator is coupled to input ends of the N multipliers, an input end of the adder is coupled to output ends of the N multipliers, and an output end of the adder is coupled to the sixth output end;

the filtering coefficient calculator is configured to: obtain a baseband signal from each of the N buffers, and calculate, based on the baseband signal obtained from each of the N buffers, a weighting coefficient of a multiplier coupled to each of the N buffers;

each of the N multipliers is configured to perform, based on the weighting coefficient, weighting processing on the baseband signal obtained from the buffer coupled to the multiplier to obtain a weighted baseband signal; and the adder is configured to add weighted baseband signals output by the N multipliers to obtain the recovered data of the transmitter.

6. The receiver according to claim 5, wherein the filtering coefficient calculator further comprises a feedback input end and wherein the feedback input end is coupled to the output end of the adder.

7. The receiver according to claim 1, wherein:

each baseband signal recovery circuit comprises an interpolation circuit and a despreading circuit coupled in series, and a clock error detection circuit and a timing control circuit coupled in series;

an input end of the interpolation circuit is coupled to the second input end, and an output end of the despreading circuit is coupled to the second output end that is configured to output the baseband signal;

an input end of the clock error detection circuit is coupled to the output end of the despreading circuit, and an output end of the timing control circuit is coupled to another input end of the interpolation circuit;

the clock error detection circuit is configured to perform clock error detection on the baseband signal to obtain clock error information;

the timing control circuit is configured to generate, based on the clock error information, interpolation position control information and the data enabling control information;

the interpolation circuit is configured to perform interpolation processing on the to-be-processed digital signal based on the interpolation position control information, to obtain a clock recovery signal; and the despreading circuit is configured to perform, based on the data enabling control information and a spreading code of a transmitter corresponding to the to-be-processed digital signal, despreading processing on the clock recovery signal to obtain the baseband signal.

8. The receiver according to claim 7, wherein the despreading circuit is configured to: determine despreading enabling control information based on the data enabling control information, and perform, based on the despreading enabling control information and the spreading code of the transmitter corresponding to the to-be-processed digital signal, despreading processing on the clock recovery signal to obtain the baseband signal.

9. The receiver according to claim 7, wherein: the receiver further comprises a reference clock circuit, an input end of the reference clock circuit is coupled to the timing control circuit; an output end of the reference clock circuit is coupled to an analog-to-digital conversion circuit; and the reference clock circuit is configured to provide a clock control signal for the analog-to-digital conversion circuit, wherein the analog-to-digital conversion circuit is synchronous with the to-be-processed digital signal of the transmitter corresponding to the timing control circuit.

10. The receiver according to claim 1, wherein:

the receiver further comprises an upsampling circuit, an input end of the upsampling circuit is coupled to an analog-to-digital conversion circuit, and an output end of the upsampling circuit is coupled to the first input end; and the upsampling circuit is configured to sample, at a preset sampling rate, a digital signal output by the analog-to-digital conversion circuit to obtain the to-be-processed digital signal.

11. The receiver according to claim 1, wherein: the receiver further comprises a dispersion compensation circuit; the dispersion compensation circuit is disposed between the analog-to-digital conversion circuit and the first input end; and the dispersion compensation circuit is configured to perform dispersion compensation to obtain the to-be-processed digital signal.

12. The receiver according to claim 1, wherein: the receiver further comprises N carrier recovery circuits; a carrier recovery circuit is disposed between each of the N third output ends and the corresponding first output end; and the carrier recovery circuit is configured to perform carrier recovery.

13. A method for receiving asynchronous-clock multi-transmitter data, the method comprising:
- receiving a to-be-processed digital signal, wherein the to-be-processed digital signal comprises data sent by a plurality of transmitters;
- processing, based on a preset spreading chip rate and a sampling rate of each of the plurality of transmitters, the to-be-processed digital signal to obtain a baseband signal of each transmitter and data enabling control information corresponding to the baseband signal, wherein each baseband signal comprises a digital signal of a plurality of sampling time points; and
- controlling, based on the data enabling control information of the plurality of transmitters, a time sequence of baseband signals for equalization filtering processing, including
  - determining, based on the data enabling control information of the plurality of transmitters, current valid flag count values of the baseband signals of the plurality of transmitters at different time points;
  - determining whether there is a time point at which a difference between a current valid flag count value of a baseband signal of another transmitter other than a transmitter utilized as a reference and a current valid flag count value of a baseband signal of the transmitter utilized as the reference is 1,
  - if the difference is 1, comparing the current valid flag count value of the baseband signal of the another transmitter with the current valid flag count value of the baseband signal of the transmitter utilized as the reference,
  - if the current valid flag count value of the baseband signal of the another transmitter is greater than the current valid flag count value of the baseband signal of the transmitter utilized as the reference, suspending performing accumulation once on the current valid flag count value of the baseband signal of the another transmitter,
  - if the current valid flag count value of the baseband signal of the another transmitter is less than the current valid flag count value of the baseband signal of the transmitter utilized as the reference, suspending performing accumulation once on the current valid flag count value of the baseband signal of the transmitter utilized as the reference, and
  - controlling, based on a current valid flag count value of each baseband signal, a write address of a random access memory (RAM) corresponding to the baseband signal, and controlling a read address of the RAM corresponding to the baseband signal by subtracting 1 from the current valid flag count value of each baseband signal, wherein the equalization filtering processing is performed on digital signal of a plurality of time points in a correct time sequence to obtain N pieces of recovered data; and
- performing the equalization filtering processing on the baseband signals by utilizing the plurality of transmitters as references to obtain recovered data of each transmitter.

14. The method according to claim 13, wherein the data enabling control information corresponding to each baseband signal is determined based on clock error information that is obtained by performing clock error detection on each baseband signal.

15. A receiver, comprising: memory comprising instructions, and one or more processors in communication with the memory, wherein the one or more processors execute the instructions to:
- receive a to-be-processed digital signal by utilizing a port, and process the to-be-processed digital signal to obtain N baseband signals of N transmitters and to obtain N pieces of data enabling control information corresponding to the N baseband signals;
- control, based on the N pieces of data enabling control information, a time sequence of the N baseband signals for equalization filtering processing;
- perform the equalization filtering processing on the N baseband signals by utilizing the N transmitters as references to obtain recovered data of the N transmitters, wherein
- N is equal to a quantity of transmitters coupled to the receiver, and N is a positive integer greater than 1;
- perform, based on the N pieces of data enabling control information, buffering control on N*N buffers corresponding to the N baseband signals, wherein the equalization filtering processing is performed on the N baseband signals in a correct time sequence to obtain the recovered data of the N transmitters, wherein each buffer comprises a random access memory (RAM);
- determine N pieces of equalization filtering enabling control information based on the N pieces of data enabling control information;
- determine current valid flag count values of the N baseband signals at different time points based on the N pieces of equalization filtering enabling control information; and
- determine whether there is a time point at which a difference between a current valid flag count value of a baseband signal of another transmitter other than a transmitter utilized as a reference and a current valid flag count value of a baseband signal of the transmitter utilized as a reference is 1, and
- if the difference is 1, compare the current valid flag count value of the baseband signal of the another transmitter with the current valid flag count value of the baseband signal of the transmitter utilized as the reference;
- if the current valid flag count value of the baseband signal of the another transmitter is greater than the current valid flag count value of the baseband signal of the transmitter utilized as the reference, suspend performing accumulation once on the current valid flag count value of the baseband signal of the another transmitter;
- if the current valid flag count value of the baseband signal of the another transmitter is less than the current valid flag count value of the baseband signal of the transmitter utilized as the reference, suspend performing accumulation once on the current valid flag count value of the baseband signal of the transmitter utilized as the reference; and
- control, based on a current valid flag count value of each baseband signal, a write address of the RAM corresponding to the baseband signal, and control a read address of the RAM corresponding to the baseband signal by subtracting 1 from the current valid flag count value of each baseband signal, wherein the equalization filtering processing is performed on digital signals of a plurality of time points in a correct time sequence to obtain N pieces of recovered data.

16. A receiver, comprising: memory comprising instructions, and one or more processors in communication with the memory, wherein the one or more processors execute the instructions to:
- receive a to-be-processed digital signal by utilizing a port, and process the to-be-processed digital signal to obtain N baseband signals of N transmitters and to obtain N pieces of data enabling control information corresponding to the N baseband signals;
- control, based on the N pieces of data enabling control information, a time sequence of the N baseband signals for equalization filtering processing;
- perform the equalization filtering processing on the N baseband signals by utilizing the N transmitters as references to obtain recovered data of the N transmitters, wherein N is equal to a quantity of transmitters coupled to the receiver, and N is a positive integer greater than 1;
- perform clock error detection on the N baseband signals to obtain N pieces of clock error information;
- generate N pieces of interpolation position control information and N pieces of data enabling control information based on the N pieces of clock error information;
- perform interpolation processing on the to-be-processed digital signal based on the N pieces of interpolation position control information to obtain N pieces of clock recovery signal; and
- perform despreading processing on the N pieces of clock recovery signal based on the N pieces of data enabling control information and spreading codes of the N transmitters to obtain the N baseband signals.

* * * * *